United States Patent
Wang et al.

(10) Patent No.: US 9,879,153 B2
(45) Date of Patent: *Jan. 30, 2018

(54) ANTI-ICING COMPOSITE

(71) Applicants: Liang Wang, Acworth, GA (US);
Viktoria Ren Wang, Acworth, GA (US)

(72) Inventors: Liang Wang, Acworth, GA (US);
Viktoria Ren Wang, Acworth, GA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/784,517

(22) Filed: Mar. 4, 2013

(65) Prior Publication Data

US 2016/0009971 A1   Jan. 14, 2016

(51) Int. Cl.
| | |
|---|---|
| *B05D 5/00* | (2006.01) |
| *B32B 27/00* | (2006.01) |
| *B32B 27/26* | (2006.01) |
| *B32B 27/40* | (2006.01) |
| *C09D 5/00* | (2006.01) |
| *C09D 175/04* | (2006.01) |
| *C09K 3/18* | (2006.01) |
| *C08G 18/10* | (2006.01) |
| *C08G 18/12* | (2006.01) |
| *C08G 18/22* | (2006.01) |
| *C08G 18/24* | (2006.01) |
| *C08G 18/32* | (2006.01) |
| *C08G 18/40* | (2006.01) |
| *C08G 18/42* | (2006.01) |
| *C08G 18/44* | (2006.01) |
| *C08G 18/48* | (2006.01) |
| *C08G 18/61* | (2006.01) |
| *C08G 18/62* | (2006.01) |
| *C08G 18/66* | (2006.01) |
| *C08G 18/75* | (2006.01) |
| *C08G 18/79* | (2006.01) |
| *C08G 101/00* | (2006.01) |

(52) U.S. Cl.
CPC ............ *C09D 175/04* (2013.01); *B05D 5/00* (2013.01); *B32B 27/00* (2013.01); *B32B 27/26* (2013.01); *B32B 27/40* (2013.01); *C08G 18/10* (2013.01); *C08G 18/12* (2013.01); *C08G 18/227* (2013.01); *C08G 18/246* (2013.01); *C08G 18/3206* (2013.01); *C08G 18/4018* (2013.01); *C08G 18/4277* (2013.01); *C08G 18/44* (2013.01); *C08G 18/4825* (2013.01); *C08G 18/4829* (2013.01); *C08G 18/61* (2013.01); *C08G 18/6279* (2013.01); *C08G 18/6611* (2013.01); *C08G 18/755* (2013.01); *C08G 18/758* (2013.01); *C08G 18/792* (2013.01); *C09D 5/00* (2013.01); *C09K 3/18* (2013.01); *B05D 2506/10* (2013.01); *B32B 2270/00* (2013.01); *B32B 2305/022* (2013.01); *C08G 2101/0008* (2013.01); *Y10T 428/3154* (2015.04); *Y10T 428/31544* (2015.04); *Y10T 428/31551* (2015.04); *Y10T 428/31569* (2015.04); *Y10T 428/31573* (2015.04)

(58) Field of Classification Search
CPC .......... C09D 5/00; C09D 175/04; C09K 3/18; B05D 5/00; B05D 2506/10; B32B 27/00; B32B 27/26; B32B 27/40; B32B 2270/00; B32B 2305/022; Y10T 428/31544; Y10T 428/3154; Y10T 428/31551; Y10T 428/31569; Y10T 428/31573; C08G 18/4825; C08G 18/4829; C08G 18/61; C08G 18/6611; C08G 18/755; C08G 18/758; C08G 18/10; C08G 18/12; C08G 18/3206; C08G 18/4018; C08G 18/4277; C08G 18/44; C08G 18/6279; C08G 18/792; C08G 18/227; C08G 18/246; C08G 2101/0008

See application file for complete search history.

(56) References Cited

U.S. PATENT DOCUMENTS

| | | | | |
|---|---|---|---|---|
| 5,017,322 | A * | 5/1991 | Brooks ..................... | 264/255 |
| 5,045,599 | A * | 9/1991 | Murase ................. | C09K 3/18 525/102 |
| 8,765,228 | B2 * | 7/2014 | Moravek et al. ......... | 427/372.2 |
| 2008/0085416 | A1 * | 4/2008 | Nagato ............... | C09D 183/04 428/422 |
| 2009/0148654 | A1 * | 6/2009 | Brown et al. ................. | 428/96 |
| 2012/0045954 | A1 * | 2/2012 | Bleecher et al. .............. | 442/80 |
| 2014/0127516 | A1 * | 5/2014 | Wang .................... | C08G 18/06 428/422 |

* cited by examiner

*Primary Examiner* — Patrick Niland

(57) ABSTRACT

The present invention relates to a novel anti-icing composite for preventing ice adhesion. A microphase separated, fluorinated nano/micro particles in aliphatic/fluorinated polyurethane/polyurea matrix coated on an elastic substratum results in anti-icing composite. The preparation method for novel anti-icing composite is disclosed.

13 Claims, No Drawings

ANTI-ICING COMPOSITE

U.S. PATENT DOCUMENTS

| | | | |
|---|---|---|---|
| U.S. Pat. No. 8,241,508 | Aug. 14, 2012 | D'Urso. Et al | 216/11 |
| U.S. Pat. No. 8,236,379 | Aug. 7, 2012 | Kobrin, et al | 427/248.1 |
| U.S. Pat. No. 8,216,674 | Jul. 10, 2012 | Simpson, et al | 428/403 |
| U.S. Pat. No. 8,211,969 | Jul. 8, 2012 | Zou, et al | 524/496 |
| U.S. Pat. No. 8,202,620 | Jun. 19, 2012 | Simon, et al | 428/442 |
| U.S. Pat. No. 8,202,614 | Jun. 19, 2012 | Koene, et al | 428/403 |
| U.S. Pat. No. 8,193,294 | Jun. 5, 2012 | Hu, et al | 528/31 |
| U.S. Pat. No. 8,187,707 | May 29, 2012 | Van Benthem, et al | 428/403 |
| U.S. Pat. No. 8,153,233 | Apr. 10, 2012 | Sheng, et al. | 428/141 |
| U.S. Pat. No. 8,147,607 | Apr. 3, 2012 | Baumgart, et al | 106/287.32 |
| U.S. Pat. No. 8,137,751 | Mar. 20, 2012 | Bhushan, et al | 727/265 |
| U.S. Pat. No. 8,067,059 | Nov. 29, 2011 | Birger, et al | 427/204 |
| U.S. Pat. No. 8,043,654 | Oct. 25, 2011 | Russell, et al | 427/154 |
| U.S. Pat. No. 8,017,234 | Sep. 13, 2011 | Jin, et al | 428/376 |
| U.S. Pat. No. 7,998,554 | Aug. 16, 2011 | Wang, et al | 428/143 |
| U.S. Pat. No. 7,985,475 | Jul. 26, 2011 | Dubrow, et al | 428/359 |
| U.S. Pat. No. 7,985,451 | Jul. 26, 2011 | Luzinov, et al | 427/258 |
| U.S. Pat. No. 7,968,187 | Jun. 28, 2011 | Chinn, et al | 428/339 |
| U.S. Pat. No. 7,943,234 | May 17, 2011 | Lawin, et al | 428/323 |
| U.S. Pat. No. 7,915,371 | Mar. 29, 2011 | Byrd, et al | 528/26 |
| U.S. Pat. No. 7,914,897 | Mar. 29, 2011 | Zimmermann, et al | 428/447 |
| U.S. Pat. No. 7,910,683 | Mar. 22, 2011 | Byrd, et al | 528/26 |
| U.S. Pat. No. 7,897,667 | Mar. 1, 2011 | Mabry, et al | 524/269 |
| U.S. Pat. No. 7,754,279 | Jul. 13, 2010 | Simpson, et al | 427/203 |
| U.S. Pat. No. 7,722,951 | May 25, 2010 | Li, et al | 428/379 |
| U.S. Pat. No. 7,704,608 | Apr. 27, 2010 | Thies, et al | 428/515 |
| U.S. Pat. No. 7,695,767 | Apr. 13, 2010 | Strauss | 427/299 |
| U.S. Pat. No. 7,491,628 | Feb. 17, 2009 | Noca, et al | 438/493 |
| U.S. Pat. No. 7,485,343 | Feb. 3, 2009 | Branson, et al | 427/335 |
| U.S. Pat. No. 7,419,615 | Sep. 2, 2008 | Strauss | 216/83 |
| U.S. Pat. No. 7,261,768 | Aug. 28, 2007 | Luten, et al | 106/287.14 |
| U.S. Pat. No. 7,258,731 | Aug. 21, 2007 | D'Urso, et al | 106/2 |
| U.S. Pat. No. 7,253,130 | Aug. 7, 2007 | Chiang, et al | 502/4 |
| U.S. Pat. No. 7,211,605 | May 1, 2007 | Coronado, et al | 516/100 |
| U.S. Pat. No. 7,202,321 | Apr. 1, 2007 | Byrd, et al | 528/26 |
| U.S. Pat. No. 7,150,904 | Dec. 19, 2006 | D'Urso, et al | 428/116 |
| U.S. Pat. No. 6,809,169 | Oct. 26, 2004 | Byrd, et al | 528/28 |
| U.S. Pat. No. 6,797,795 | Sep. 28, 2004 | Byrd | 528/26 |
| U.S. Pat. No. 6,743,467 | Jun. 1, 2004 | Jones, et al | 427/180 |
| U.S. Pat. No. 6,733,892 | May 11, 2004 | Yoneda, et al | 428/447 |
| U.S. Pat. No. 6,702,953 | Mar. 9, 2004 | Simendinger, et al | 252/70 |
| U.S. Pat. No. 6,649,222 | Nov. 18, 2003 | D'Agostino, et al | 427/490 |
| U.S. Pat. No. 6,579,620 | Jun. 17, 2003 | Mizuno, et al | 428/447 |
| U.S. Pat. No. 6,486,245 | Nov. 26, 2002 | Thunemann, et al | 524/130 |
| U.S. Pat. No. 6,432,486 | Aug. 13, 2002 | Paris, et al | 427/447 |
| U.S. Pat. No. 6,395,345 | May 28, 2002 | S.o slashed.rensen | 427/475 |
| U.S. Pat. No. 6,362,135 | Mar. 26, 2002 | Greer | 508/113 |
| U.S. Pat. No. 6,183,872 | Feb. 6, 2001 | Tanaka, et al | 428/429 |
| U.S. Pat. No. 6,153,304 | Nov. 28, 2000 | Smith, et al | 428/447 |
| U.S. Pat. No. 6,114,448 | Sep. 5, 2000 | Derbes | 525/104 |
| U.S. Pat. No. 6,114,446 | Sep. 5, 2000 | Narisawa, et al | 525/104 |
| U.S. Pat. No. 6,084,020 | Jul. 4, 2000 | Smith, et al | 524/501 |
| U.S. Pat. No. 6,068,911 | May 30, 2000 | Shouji, et al | 428/143 |
| U.S. Pat. No. 5,904,959 | May 18, 1999 | Martin | 427/256 |
| U.S. Pat. No. 5,747,561 | May 5, 1998 | Smirnov, et al | 523/212 |
| U.S. Pat. No. 5,736,249 | Apr. 4, 1998 | Smith, et al | 428/447 |
| U.S. Pat. No. 5,565,714 | Jun. 21, 1986 | Koshar | 427/515 |
| U.S. Pat. No. 5,336,715 | Aug. 9, 1994 | Seipka, et al | 524/765 |
| U.S. Pat. No. 5,294,252 | Mar. 15, 1994 | Gun | 106/287.13 |
| U.S. Pat. No. 5,188,750 | Feb. 23, 1993 | Kogue, et al | 252/70 |
| U.S. Pat. No. 5,187,015 | Feb. 16, 1993 | Yorkgitis, et al | 428/447 |
| U.S. Pat. No. 5,075,378 | Dec. 24, 1991 | Smierciak, et al | 525/109 |
| U.S. Pat. No. 5,045,599 | Sep. 3, 1991 | Murase | 525/102 |
| U.S. Pat. No. 5,008,135 | Apr. 16, 1991 | Giordano, et al | 427/386 |
| U.S. Pat. No. 4,774,112 | Sep. 27, 1988 | Achtenberg, et al | 427/387 |
| U.S. Pat. No. 4,301,208 | Nov. 17, 1981 | Jellinek, et al | 428/334 |
| U.S. Pat. No. 3,931,429 | Jun. 6, 1976 | Reick | 428/149 |

OTHER REFERENCES

[1] Silicon-Containing Polymers: The Science and Technology of Their Synthesis and Applications, Jones, R. G., Ando, W., & Chojnosski, J., Kjuwer Academic Publisher, 2000

[2] Modern Fluoropolymers, High Performance Polymers for Diverse Applications, Scheirs, J., John Wiley & Sons, 1997

[3] Tests of the Performance of Coatings for Low Ice Adhesion, D. N. Anderson, NASA Lewis Research Center, Cleveland Ohio and A. D. Reich, BF Goodrich R&D Center, Brecksville, Ohio, AIAA-97-0303, 35$^{th}$ Aerospace Sciences Meeting & Exhibit, Jan. 6-10, 1997/Reno, Nev.

[4] Anti-icing performance of superhydrophobic surfaces, S. Farhadi, M. Farzaneh and S. A. Kulinich, Appl. Sur. Sci., 257(14) 6264 (2011)

[5] Raster-Elekronenmikroskopie der Epidermis-Oberflachen von Spermatophyten, Barthlott, Wilhelm, Ehler, N. Tropishe and Subtropishe Pflanzenwelt (Akad, Wiss. Lit. Mainz) 19, 110, 1977

[6] Superhydrophobic Surfaces, Cane, A & Mittal, K. L. (2009)

[7] Biomimetics: Bioinspired Hierarchical-Structured Surfaces for Green Science and Technology (Biological and Medical Physics, Biomedical Engineering), Bharat Bhushan (2012)

[8] Micro- and Nanostructured Multiphase Polymer Blend Systems: Phase Morphology and Interfaces, Editor: Charef Harrats, Sabu Thomas, Gabriel Groeninckx (2005) CRC Taylor & Trancis,

[9] Phase-Separated Interpenetrating Polymer Networks (Advances in Polymer Science 208) by Yuri S. Lipatov and Tatiana Alekseeva (2010), Springer.

[10] Advances in Elastomers I: Blends and Interpenetrating Networks (advanced Structured Materials) by Sabu Thomas, Aji P. Mathew, Amp K Chandra and P. M. Visakh (2012) Springer

[11] Handbook of Multiphase Polymer Systems by Abderrahim Boudenne, Laurent Ibos, Yves Candau and Sabu Thomas (2011) Kindle Edition.

[12] Well-Architectured Fluoropolymers: Synthesis, Properties and Applications, Ameduri, B. and Boutevin, B, Elsevier, 2004.

[13] The Chemistry of Radical Polymerization, Second fully revised edition, Graeme Moad and David H. Solomon (2006) Elsevier

[14] Applied Homogeneous Catalysis with Organometallic Compounds: A Comprehensive Handbook in Two Volumes by Boy Comils (2000).

TECHNICAL FIELD OF THE INVENTION

The present invention relates to a novel anti-icing composite for preventing ice adhesion. A microphase separated, fluorinated nano/micro particles in aliphatic/fluorinated polyurethane/polyurea matrix coated on an elastic substratum results in anti-icing composite. The preparation method for novel anti-icing composite is disclosed.

BACKGROUND OF THE INVENTION

A composite for preventing ice adhesion, facilitating the removal of ice, snow, and frozen contaminants is desirable. The application fields are very broad, encompassing critical areas such as aircraft, vehicles, marine, wind turbine, and electric power cables.

Many low surface energy materials, such as silicon-containing polymers [1], fluoropolymers [2] and their composites are claimed as anti-icing coatings, such as: U.S. Pat. No. 8,202,620, U.S. Pat. No. 8,193,294, U.S. Pat. No. 7,897,667, U.S. Pat. No. 7,915,371, U.S. Pat. No. 7,910,683, U.S. Pat. No. 7,261,768, U.S. Pat. No. 7,261,768, U.S. Pat. No. 7,202,321, U.S. Pat. No. 6,809,169, U.S. Pat. No. 6,797,795, U.S. Pat. No. 6,733,892, U.S. Pat. No. 6,579,620, U.S. Pat. No. 6,432,486, U.S. Pat. No. 6,395,345, U.S. Pat. No. 6,363,135, U.S. Pat. No. 6,183,872, U.S. Pat. No. 6,153,304, U.S. Pat. No. 6,114,448, U.S. Pat. No. 6,084,020, U.S. Pat. No. 6,068,911, U.S. Pat. No. 5,904,959, U.S. Pat. No. 5,747,561, U.S. Pat. No. 5,736,249, U.S. Pat. No. 5,336,715, U.S. Pat. No. 5,188,750, U.S. Pat. No. 5,187,015, U.S. Pat. No. 5,075,378, U.S. Pat. No. 5,045,599, U.S. Pat. No. 5,008,135, U.S. Pat. No. 4,565,714, and U.S. Pat. No. 4,301,208.

The NASA Lewis Research Center, which operates the world's largest refrigerated Icing Research Tunnel (IRT), has performed icing research for over 50 years. The studies conducted by NASA and other researchers have concluded that fluoropolymers, siloxane resins, their composites, as surface coatings are inadequate for anti-icing applications [3].

Superhydrophobic nano-micron hierarchical structures of lotus leaves have been studied since 1977 [5]. Various approaches for mimicking the surface topography and surface chemistry of lotus leaves have been attempted, resulting in the launch of biomimetic products [6, 7]. The main methods developed so far have been: 1) layer-by-layer assembly, 2) polymer film roughening, 3) chemical vapor deposition, 4) sol-gel process, 5) phase separation, 6) hydrothermal synthesis, and 7) coating with composites of nanoparticles. The following are typical examples of US patents that are related to superhydrophobic coatings: U.S. Pat. No. 8,241,508, U.S. Pat. No. 8,236,379, U.S. Pat. No. 8,216,674, U.S. Pat. No. 8,211,969, U.S. Pat. No. 8,202,614, U.S. Pat. No. 8,187,707, U.S. Pat. No. 8,153,233, U.S. Pat. No. 8,147,607, U.S. Pat. No. 8,137,751, U.S. Pat. No. 8,067,059, U.S. Pat. No. 8,043,654, U.S. Pat. No. 8,017,234, U.S. Pat. No. 7,998,554, U.S. Pat. No. 7,985,475, U.S. Pat. No. 7,985,451, U.S. Pat. No. 7,968,187, U.S. Pat. No. 7,943,234, U.S. Pat. No. 7,914,897, U.S. Pat. No. 7,754,279, U.S. Pat. No. 7,722,951, U.S. Pat. No. 7,704,608, U.S. Pat. No. 7,695,767, U.S. Pat. No. 7,485,343, U.S. Pat. No. 7,419,615, U.S. Pat. No. 7,291,628, U.S. Pat. No. 7,258,731, U.S. Pat. No. 7,253,130, U.S. Pat. No. 7,211,605, U.S. Pat. No. 7,150,904, U.S. Pat. No. 6,743,467, U.S. Pat. No. 6,649,222, U.S. Pat. No. 3,391,428

However, superhydrophobic surfaces do not always shown low ice adhesion properties. Secondly, anti-icing properties deteriorate by repeated icing/de-icing cycles due to the destruction of very thin and fragile nano/micron hierarchical structures. Thirdly, prolonged exposure to high humidity levels leads to high ice bonding forces due to ice forming in and getting trapped into inter-asperity spaces [4].

SUMMARY OF THE INVENTION

Accordingly, the primary objective of this invention is to provide a durable anti-icing composite which addresses these problems.

A durable, icing protecting composite surface with zero ice adhesion is currently unknown. The present invention relates to a durable anti-icing composite with zero ice adhesion. The novel anti-icing surface repels water, delays ice formation, hindrances ice adhesion, or upon freezing, ice will be split apart from anti-icing surfaces.

The present invention relates to a novel composite having a microphase separated, fluorinated nano/micro particles in fluorinated polyurethane matrix coated on an elastic substratum that provides mechanical durability and robustness, and feasibility for large area fabrication.

It is well known that low surface energy materials, such as fluoropolymers have water repellent-hydrophobic property.

It is unexpected that a novel anti-icing coating results from self-assembled, microphase separated, fluorinated nano/micro particles in fluorinated polyurethane/polyurea matrix network having urethane (carbamate)/urea segments driven by catalytic chemical reaction.

It is unexpected that ice/snow cannot bond to a novel anti-icing coating when temperature is below water freezing point.

It is also unexpected that ice/snow splits off a novel anti-icing coating when surface under vibration.

It is unexpected that an enhanced anti-icing ability results from elastic substratum whereon coated with novel anti-icing coating.

It is unexpected that a novel anti-icing composite results in novel anti-icing coating with elastic substratum.

It is unexpected that ice splits off a surface of novel anti-icing composite upon liquid water freezing into ice.

It is the primary object of the invention to provide preparation method of catalytic reactive composition results in fluorinated polyurethane/polyurea matrix dispersed with nano/micro fluorinated particles for preparation of novel anti-icing composite.

It is the primary object of this invention to provide synthesis method of reactive functional polymer and prepolymer for preparation of novel low anti-icing coating.

It is another object of the invention to select suitable elastic substratum for preparing novel anti-icing composite.

It is another object of the invention to provide suitable crosslink co-reactant composition suitable for catalytic reaction composition for novel anti-icing coating.

It is another object of the invention to provide suitable catalyst suitable for the catalytic reaction composition for anti-icing

DETAILED DESCRIPTION OF THE INVENTION

Anti-icing composite results in zero ice adhesion are unknown in the art. Present invention relates to novel composite results in zero ice adhesion. For example, when super cooled water frozen onto a surface of novel anti-icing composite, ice splits apart from such surface with or without vibration.

Phase Separation (PS) and Interpenetrating Polymer Networks (IPN) are known in the art [8-11]. However, the application of PS or IPN for anti-icing coating is unknown in the art.

Present invention discovers that a microphase separated, nano/micro fluorinated polymer particles in fluorinated polyurethane/polyurea matrix shows high anti-icing ability measured as force to remove ice from unite area of ice-frozen surface.

Present invention discovers that patterns of morphology and domains of microphase of fluorinated polymer particles dispersed in fluorinated polyurethane/polyurea matrix are related with anti-ice property.

Present invention discovers that a friction process changes the patterns, shape, domain dimension, morphology of microphase, and therefore, increases anti-icing abilities.

It is highly desirable that a method able to provide optimum pattern of microphase morphology which is only based on molecular structures of initial composition and is independent on other variation or parameters.

Since outdoor field applications, such as aircraft, wind turbine, high voltage electric power lines, marine structures which require long term operation with UV, weathering, cleanability, abrasion resistances and cleanability. It is highly desirable to utilize fluorine-containing or siloxane-containing polymers because they are proven for high demanding application in hostile UV and weathering environments. It is highly desirable to utilize fluorinated and siloxane segments. It is well known fluorinated polymer or polysiloxane lead to large change on surface properties, such as low surface energy, hydrophobic, water repellency, cleanability, and thermal stability.

The reaction between isocyanato (—N═C═O) group and hydroxyl (—OH) group forms carbamate (urethane) (—O—CO—NH—) link. Polyurethane is a polymer characterized by carbamate (urethane) link.

The reaction between isocyanato (—N═C═O) group and amino (—NHR—) group forms urea (—NH—CO—NR—) link (R═H or organic moiety). Polyurea is a polymer characterized by urea link. Urethane and urea links are desirable because both bonds are chemically stable and can be formed under ambient or low temperature. Urethane and urea links form hard crystalline domain which are immiscible and separated from fluorinated or siloxane segments. Since elastic property is related phase separation. It is desired to form microphase separation of hard crystalline domain of urethane/urea dispersed in continuous amorphous soft fluorinated or siloxane matrix.

We declare functional or polyfunctional fluorinated reactant as following molecule: (a) a molecule contains fluorinated moiety in side-chains, such as those contains fluorine atoms or fluorinated organic moiety in side-chains or side groups; (b) a molecule contains fluorinated segment in main-chain, i.e. either perfluorinated or partially fluorinated backbone; (c) a molecule contains mixed side-chain and main-chain fluorinated moiety, i.e. either perfluorinated or partially fluorinated backbone and fluorine or fluorinated organic moiety on side-chains.

The functional or polyfunctional fluorinated reactant selected can be polymer or oligomer. Polymer is considered to containing 50 repeat units or more. Oligomer is a polymer with only a few repeat units. Therefore, dimer, trimer, tetramer are oligomer. However, we use polymer to cover both polymer and oligomer.

In this invention functional fluorinated reactant is selected from the groups consisting of: (a) functional reactant containing fluorinated moiety in side-chains, (b) functional reactant containing fluorinated segments in main-chain, (c) functional reactant containing both fluorinated side-chains and fluorinated segments in main-chain, (d) functional reactant containing both fluorinated segments in main chain and siloxane segments in main-chain, (e) functional reactant containing both fluorinated segments in main-chain and siloxane moiety in side-chains, and (f) functional reactant containing both fluorinated moiety in side-chain and siloxane moiety in side-chains.

Present invention discovered anti-icing coating results from nano/micro fluorinated polymer particles dispersed in fluorinated urethane/urea matrix with urethane/urea cross-links driven by a catalytic chemical reaction composition.

Present invention discovered the novel anti-icing coating which determined on reactant molecular structures and catalyst in reaction composition.

Present invention discover that a self-assembly, nano/micro fluorinated polymer particles in fluorinated matrix containing urethane/urea links driven by catalytic reaction results in low ice adhesion coating.

Present invention discovered that novel anti-icing coating coated on flexible substratum enable ice split apart from surface when super cooled water frozen into ice.

Present invention discovered that novel anti-icing coating coated on a rigid substrate enable ice split apart from the surface when it is under vibration.

In one embodiment of present invention, an anti-icing composite comprises of a coating composition coated onto an elastic substratum; wherein said coating composition comprising of: (a) at least a plurality of fluorinated polymer particles, said fluorinated polymer is polymerization product of fluorinated monomer; (b) at least a polyfunctional fluorinated reactant, said polyfunctional fluorinated reactant having a plurality of reactive group, said reactant is selected from group consisting of oligomer, polymer, prepolymer, and a mixture thereof; said reactive group is selected from the group consisting of hydroxyl, hindered amino, aspartic ester amino, isocyanato, and a mixture thereof; (c) at least a polyisocyanate, said polyisocyanate is selected from the group consisting of monomeric diisocyanate, oligomeric polyisocyanate, polyfunctional isocyanate prepolymer, modified polyisocyanate and a mixture thereof; (d) at least a catalyst, said catalyst is selected from the group consisting of tertiary amine, organometallic complex, and a mixture thereof; (e) at least a solvent; wherein said elastic substratum is selected from the group consisting of elastomer, closed-cell foamed elastomer, microcellular closed-cell foamed elastomer, and a mixture thereof.

In one embodiment of present invention of anti-icing composite, wherein said plurality of fluorinated polymer particles is a plurality of partially de-agglomerated micron particles agglomerated by a plurality of fluorinated polymer nanoparticles, said fluorinated polymer is polymerization product of fluorinated monomer, said fluorinated monomer is selected from the group consisting of tetrafluoroethylene, hexafluoropropylene, perfluoroalkyl vinyl ether, perfluoromethoxyvinyl ether, perfluorinated methacrylate, perfluorinated acrylate, 2,2-bistrifluoromethyl-4,5-difluoro-1,3-dioxole, perfluorinated styrene, perfluorinated tetrahydrofuran, perfluorinated oxetane, hexafluoroisobutylene, vinylidene difluoride, difluoroethylene, trifluoroethylene, 3,3,3-trifluoropropene, 2,3,3,3-tetrafluoropropene, 1,2,3,3,3-pentafluoropropene, chlorotrifluoroethylene, hexafluoropropylene oxide, hydropentafluoropropylene, and a mixture thereof.

In one embodiment of present invention of anti-icing composite, wherein said polyfunctional fluorinated reactant is selected from the group consisting of telechelic difunctional fluorinated, pendant polyfunctional fluorinated, and a mixture thereof; said telechelic difunctional fluorinated is obtained by ring-opening polymerization of fluoroalkyl cyclic ether, and with functional initiation or end-capping; said pendant polyfunctional fluorinated is synthesized by copolymerization of: (3a) an fluorinated monomer, (3b) an aliphatic or cyclo-aliphatic oxygen-containing vinyl group-containing monomer, and (3c) a hydroxyl functional group aliphatic or cyclo-aliphatic oxygen-containing vinyl group-containing monomer; an optional chemical converting of hydroxyl functional group into other functional group, and said other functional group is selected from the group consisting of secondary amino, or isocyanato.

In one embodiment of present invention of anti-icing composite, wherein said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, polyisocyanates based on isophorone diisocyanate, polyisocyanates based on 4,4'-diisocyanato dicyclohexylmethane, isocyanato terminated polyether prepolymer, isocyanato terminated polyester prepolymer, isocyanato terminated polycarbonate prepolymer, isocyanato terminated polycaprolactone prepolymer, isocyanato terminated fluorinated telechelic prepolymer, isocyanato terminated fluorinated pendant prepolymer, and a mixture thereof.

In one embodiment of present invention of anti-icing composite, wherein said catalyst is selected from the group consisting of tertiary amine, organometallic complex, and a mixture thereof, said tertiary amine is selected from the group consisting of triethylenediamine, 1,4-diazabicyclo[2,2,2]octane, N,N-dimethylcyclohexylamine, dimethylethanolamine, bis[2-dimethylaminoethyl]ether, N,N-dimethylaminopropylamine, N,N,N',N',N'-pentamethyldiethylenetriamine, diethanolamine, 2[2-dimethylaminoethyoxyl]ethanol, N-[2-(dimethylamino)ethyl]-N-mmethylethanolamine, dimethylethanolamine, 3-dimethylamino-N,N-dimethylpropioamide, N-ethylmorpholine, and a mixture thereof; said organometallic complex is selected from the group consisting of tin carboxylate, tin octoate, tin neodecanoate, tin octoate, tin oleate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate)tin, dioctyldilauryltin, bismuth carboxylate, iron octoate, zinc octoate, amine-cuprous chloride complex, zirconium dionate, zirconium tetrakis(2,4-pentanedionate) complex, aluminum dionate, aluminum tris(2,4-pentanedionate) complex, titanium di-n-butoxide (bis-2,4-pentanedionate), titanium diisopropoxide (bis-2,4-pentanedionate), titanium diisopropoxide bis (ethylacetoacetate), titanium 2-ethylhexoxide, titanium trimethylsiloxide, and a mixture thereof.

In one embodiment of present invention of anti-icing composite, wherein said solvent is selected from the group consisting of acetone, methyl acetate, tert-butyl acetate, methylene chloride, methyl chloroform, parachlorobenzotrifluoride, acetonitrile, acetophenone, amyl acetate, benzyl benzoate, bis(2-ethylhexyl) adipate, butanone, butyl acetate, sec-butyl acetate, tert-butyl acetate, n-butyl propionate, gama-butylolactone, chloroform, cyclohexanone, cyclopentanone, dichloromethane, diethyl carbonate, diethyl ketone, diisobutyl ketone, dimethyl carbonate, N,N-dimethylacetamide, N,N-dimethylformamide, dimethyl sulfoxide dioctyl terephthalate, 1,4-dioxane, 2-ethoxyethyl ether, ethyl acetoacetate, ethyl butyrate, ethyl lactate, ethylene carbonate, cyclobutanone, cyclohexanone, cyclopentanone, ethyl isopropyl ketone, hexyl acetate, isoamyl acetate, isobutyl acetate, isobutyl isobutyrate, isopropyl acetate, isophorone, methyl acetate, methyl amyl acetate, methyl butyl ketone, methyl chloroform, methyl isoamyl ketone, methyl isobutyl ketone, methyl isopropyl ketone, methyl propyl ketone, 1-methyl-2-pyrrolidinone, octyl acetate, parachlorobenzotrifluoride, perchloroethylene, 3-pentanone, n-pentyl propionate, beta-propyolactone, tetrahydrofuran, toluene, delta-valerolactone, xylene, cyclic methylated siloxanes, branched methylated siloxanes, linear methylated siloxanes and a mixture thereof.

In one embodiment of present invention of anti-icing composite, wherein said coating composition contains an optional polyfunctional siloxane reactant having a plurality of reactive group, said siloxane reactant is selected from group consisting of oligomeric, polymeric, prepolymer, and a mixture thereof; said reactive group is selected from the group consisting of hydroxyl, amino, carbinol, silanol, hydride, isocyanato, and a mixture thereof.

In one embodiment of present invention of anti-icing composite, where said coating composition contains an optional polyfunctional aliphatic reactant, said aliphatic reactant is selected from the group consisting of aliphatic polyol, aliphatic polyalkylamine, and a mixture thereof; said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether)glycol, castor polyol, vegetable polyol, and a mixture thereof; said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof.

In one embodiment of present invention of anti-icing composite, where said coating composition contains an optional chain extender, said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

In one embodiment of present invention of anti-icing composite, where said coating composition contains an optional surface fluorine enrichment additive, said surface fluorine enrichment additive is selected from the group consisting of perfluoroalkylethyl alcohols, fluorotelomer alcohol, PFPO fluorotelechelic diols, PFPE fluorotelechelic diols, fluorine-rich polyol oligomer containing at least a fluorine-rich monomer unit, said fluorine-rich monomer is selected from the group consisting of perfluoroalkyl acrylate, perfluoroalkyl vinyl ether, and a mixture thereof.

In one embodiment of present invention of anti-icing composite, wherein said elastomer is a elastomer with low glass transition temperature, said elastomer is selected from the group consisting of polyurea elastomer, polyurethane elastomer, nature polyisoprene, cis-1,4-polyisoprene, trans-1,4-polyisoprene, synthetic polyisoprene, polybutadiene rubber, chloroprene rubber, Neoprene, poly(isobutylene-co-isoprene), chlorobutyl rubber, nitrile rubber, hydrogenated nitrile rubber, ethylene propylene rubber, ethylene propylene diene rubber, epichlorohydrin rubber, polyacrylic rubber, silicone rubber, polyether block amide, chlorosulfonated polyethylene, polysulfide rubber, fluorosilicone rubber, fluorocarbon elastomer, perfluoroelastomer, polybutadiene-acrylonitrile, Tiokol, fluoroelastomer, polypentenomer, alternating rubber, polystyrene, polyether ester, polysulfide, polystyrenic block copolymer, polyolefin blend, elastomeric alloy, thermoplastic polyurethane, thermoplastic polyester, thermoplastic polyamide, thermoplastic polyamide, carboxylated nitrile rubber, hydrogenated nitrile rubber, ethylene propylene rubber, and a mixture thereof.

In other embodiment of present invention, an anti-icing composite comprises of a coating composition coated onto an elastic substratum, wherein said coating composition comprising of: (a) at least a plurality of fluorinated polymer particles, said fluorinated polymer is polymerization product of fluorinated monomer, (b) at least a polyol prepolymer having a plurality of reactive groups, said plurality of reactive groups is selected from the group consisting of hydroxyl, isocyanato, and a mixture thereof, (c) at least a polyisocyanate prepolymer having a plurality of isocyanato terminated reactive groups, (1 d) at least a catalyst, said catalyst is selected from the group consisting of tertiary amine, organometallic complex, and a mixture thereof, (e) at least a solvent; wherein said elastic substratum is selected from the group consisting of elastomer, closed-cell foamed elastomer, microcellular closed-cell foamed elastomer, and a mixture thereof.

In other embodiment of present invention, wherein said plurality of fluorinated polymer particles is a plurality of partially de-agglomerated micron particles agglomerated by a plurality of fluorinated polymer nanoparticles; said fluorinated polymer is polymerization product of fluorinated monomer, said fluorinated monomer is selected from the group consisting of tetrafluoroethylene, hexafluoropropylene, perfluoroalkyl vinyl ether, perfluoromethoxyvinyl ether, perfluorinated methacrylate, perfluorinated acrylate, 2,2-bistrifluoromethyl-4,5-difluoro-1,3-dioxole, perfluorinated styrene, perfluorinated tetrahydrofuran, perfluorinated oxetane, hexafluoroisobutylene, vinylidene difluoride, difluoroethylene, trifluoroethylene, 3,3,3-trifluoropropene, 2,3,3,3-tetrafluoropropene, 1,2,3,3,3-pentafluoropropene, chlorotrifluoroethylene, hexafluoropropylene oxide, hydropentafluoropropylene, and a mixture thereof.

In other embodiment of present invention, wherein said polyol prepolymer is made by reacting polyisocyanate with excess: (a) aliphatic reactant, and (b) chain extender; said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, and a mixture thereof; said aliphatic reactant is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether)glycol, castor polyol, vegetable polyol, polyaspartic ester amine, aldimine, polycaprolactone polyalkylamine, polycarbonate polyalkylamine, polyether polyalkylamine, polyester polyalkylamine, polyacrylic polyalkylamine, fluorinated telechelic diol, fluorinated pendant polyol, and a mixture thereof; said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

In other embodiment of present invention, wherein said polyisocyanate prepolymer is made by reacting excess polyisocyanate with: (a) aliphatic reactant, (b) chain extender; said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, and a mixture thereof; said aliphatic reactant is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether)glycol, castor polyol, vegetable polyol, polyaspartic ester amine, aldimine, polycaprolactone polyalkylamine, polycarbonate polyalkylamine, polyether polyalkylamine, polyester polyalkylamine, polyacrylic polyalkylamine, fluorinated telechelic diol, fluorinated pendant polyol, and a mixture thereof; said chain extender is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl)ethylenediamine, and a mixture thereof.

In other embodiment of present invention, wherein said catalyst is selected from the group consisting of tertiary amine, organometallic complex, and a mixture thereof, said tertiary amine is selected from the group consisting of triethylenediamine, 1,4-diazabicyclo[2,2,2]octane, N,N-dimethylcyclohexylamine, dimethylethanolamine, bis[2-dimethylaminoethyl]ether, N,N-dimethylaminopropylamine, N,N,N',N',N'-pentamethyldiethylenetriamine, diethanolamine, 2[2-dimethylaminoethyoxyl]ethanol, N-[2-(dimethylamino)ethyl]-N-mmethylethanolamine, dimethylethanolamine, 3-dimethylamino-N,N-dimethylpropioamide, N-ethylmorpholine, and a mixture thereof said organometallic complex is selected from the group consisting of tin carboxylate, tin octoate, tin neodecanoate, tin octoate, tin oleate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate)tin, dioctyldilauryltin, bismuth carboxylate, iron octoate, zinc octoate, amine-cuprous chloride complex, zirconium dionate, zirconium tetrakis(2,4-pentanedionate) complex, aluminum dionate, aluminum tris(2,4-pentanedionate) complex, titanium di-n-butoxide (bis-2,4-pentanedionate), titanium diisopropoxide (bis-2,4-pentanedionate), titanium diisopropoxide bis(ethylacetoacetate), titanium 2-ethylhexoxide, titanium trimethylsiloxide, and a mixture thereof.

In other embodiment of present invention, wherein said solvent is selected from the group consisting of acetone, methyl acetate, tert-butyl acetate, methylene chloride, methyl chloroform, parachlorobenzotrifluoride, acetonitrile, acetophenone, amyl acetate, benzyl benzoate, bis(2-ethylhexyl) adipate, butanone, butyl acetate, sec-butyl acetate, tert-butyl acetate, n-butyl propionate, gama-butylolactone, chloroform, cyclohexanone, cyclopentanone, dichloromethane, diethyl carbonate, diethyl ketone, diisobutyl ketone, dimethyl carbonate, N,N-dimethylacetamide, N,N-dimethylformamide, dimethyl sulfoxide dioctyl terephthalate, 1,4-dioxane, 2-ethoxyethyl ether, ethyl acetoacetate, ethyl butyrate, ethyl lactate, ethylene carbonate, cyclobutanone, cyclohexanone, cyclopentanone, ethyl isopropyl ketone, hexyl acetate, isoamyl acetate, isobutyl acetate, isobutyl isobutyrate, isopropyl acetate, isophorone, methyl acetate, methyl amyl acetate, methyl butyl ketone, methyl chloroform, methyl isoamyl ketone, methyl isobutyl ketone, methyl isopropyl ketone, methyl propyl ketone, 1-methyl-2-pyrrolidinone, octyl acetate, parachlorobenzotrifluoride, perchloroethylene, 3-pentanone, n-pentyl propionate, beta-propyolactone, tetrahydrofuran, toluene, delta-valerolactone, xylene, cyclic methylated siloxanes, branched methylated siloxanes, linear methylated siloxanes and a mixture thereof.

In other embodiment of present invention, where said coating composition contains an optional surface fluorine enrichment additive, said surface fluorine enrichment additive is selected from the group consisting of perfluoroalkylethyl alcohols, fluorotelomer alcohol, PFPO fluorotelechelic diols, PFPE fluorotelechelic diols, fluorine-rich polyol oligomer containing at least a fluorine-rich monomer unit, said fluorine-rich monomer is selected from the group consisting of perfluoroalkyl acrylate, perfluoroalkyl vinyl ether, and a mixture thereof.

A preferred elastomer material for elastic substratum are elastomeric polyurea having a glass transition temperature (Tg) between −50° C. to −60° C., and elastomeric polyurethane has a Tg between −40° C. to −50° C.

In the present invention, a preferred elastomer as substratum material is selected from the group consisting of polyurea elastomer, polyurethane elastomer, nature polyisoprene, cis-1,4-polyisoprene (natural rubber NR), trans-1,4-polyisoprene (gutta-percha), synthetic polyisoprene (IR), polybutadiene rubber (BR), chloroprene rubber (Neoprene, CR), poly(isobutylene-co-isoprene) (Butyl rubber, IIR), chlorobutyl rubber (CIIR), nitrile rubber (NBR), hydrogenated nitrile rubber (HNBR), ethylene propylene rubber (EPM), ethylene propylene diene rubber (EPDM), epichlorohydrin rubber (ECO), polyacrylic rubber (ACM, ABR), silicone rubber (VMQ), polyether block amide (PEBA), chlorosulfonated polyethylene (CSM), polysulfide rubber, fluorosilicone rubber (FVMQ), fluoroelastomer (FKM and FEPM), perfluoroelastomer (FFKM), polybutadiene-acrylonitrile, Tiokol, fluoroelastomer, polypentenomer, alternating rubber, polystyrene, polyether ester, polysulfide, and a mixture thereof.

A preferred thermoplastic elastomer as substratum material is selected from the group consisting of polystyrenic block copolymer, polyolefin blend, elastomeric alloy (TPE-v, TPV), thermoplastic polyurethane, thermoplastic polyester, thermoplastic polyamide, and a mixture thereof.

Present invention discovered that anti-icing coating can be formulated into two component system.

For example, the first component contains polyols or polyamines, and second component contains polyisocyanates. For other example, the first component comprises polyol prepolymer and/or polyamine prepolymer, the second component comprises polyisocyanate prepolymer. Both parts may contain solvent or mixed solvent. The catalyst, tertiary amine, organometallic complex or a mixture of organometallics are preferred adding in polyol part. However, catalyst or mixed catalysts can be added in polyisocyanate part or added in both polyol part and polyisocyanate part. The fluorinated polymer particles can be added in the polyol or polyamine part, polyisocyanate part, or in both parts.

This invention discovered that surface enrichment of fluorine-rich fluorinated compound, such as oligomer or polymer containing fluoroalkyl side-chains, further reduces surface energy and increases anti-icing capability of novel anti-icing composite. Common fluorine-rich compound are copolymers containing monomers of fluoroalkyl acrylate, fluoroalkylethyl acrylate, fluoroalkyl methacrylate, fluoroalkylethyl methacrylate, fluoroalkyl vinyl ether, and fluoropolyether; polymers by ring open polymerization of fluoroepoxide, fluorooxirane, fluorooxetane, fluorofuran, and fluorinated polysiloxane.

In one embodiment of this invention, an anti-icing composite comprises of a coating composition coated onto an elastic substratum wherein said coating composition comprising of: (a) at least a plurality of fluorinated polymer particles, said fluorinated polymer is polymerization product of fluorinated monomer; (b) at least a polyfunctional prepolymer having a plurality of functional group, said functional is selected from the group consisting of hydroxyl, amino, isocyanato, and a mixture thereof; (c) at least a polyisocyanate prepolymer having a plurality of isocyanato group; (d) at least a surface fluorine-rich functional fluorinated reactant having at least a hydroxyl group; (e) at least a catalyst, said catalyst is selected from the group consisting of tertiary amine, organometallic complex, and a mixture thereof; and (f) a solvent; wherein said elastic substratum is selected from the group consisting of elastomer, closed-cell foamed elastomer, microcellular closed-cell foamed elastomer, low glass transition temperature elastomer, low glass transition temperature thermoset (vulcanization) elastomer, low glass transition temperature thermoplastic elastomer, and a mixture thereof.

Fluoropolymer Particles—for Microphase Separated Fluorinated Surfaces

Non-functional fluorinated thermoplastics, fluorinated elastomers are known art [2]. In a preferred embodiment of the invention, fluoroolefin polymer powders (the plurality of particles) provide microphase separation/segregation morphology structure that is necessary factor for low-ice adhesion surfaces. Fluorinated polymer particles are synthesized by homopolymerization or copolymerization of fluorinated monomers [2]. The preferred fluorinated monomer is selected from the group consisting of tetrafluoroethylene (TFE), hexafluoropropylene (HFP), perfluoroalkyl vinyl ether (PAVE), perfluoromethoxyvinyl ether, perfluorinated methacrylate, perfluorinated acrylate, 2,2-bistrifluoromethyl-4,5-difluoro-1,3-dioxole, perfluorinated styrene, perfluorinated tetrahydrofuran, perfluorinated oxetane, hexafluoroisobutylene, vinylidene difluoride, difluoroethylene, trifluoroethylene, 3,3,3-trifluoropropene, 2,3,3,3-tetrafluoropropene, 1,2,3,3,3-pentafluoropropene, chlorotrifluoroethylene, hexafluoropropylene oxide, hydropentafluoropropylene, and a mixture thereof.

According to a preferred embodiment of the invention, fluoroolefin polymer particles with high fluorine content (F≥59 w/w %) are selected from a fluorinated polymer which is synthesized by polymerization (homopolymerization or copolymerization) of a fluorinated monomer or mixed monomers. Preferred fluorinated monomer is selected from the group consisting of tetrafluoroethylene (TFE), hexafluoropropylene (HFP), 3,3,3-trifluoropropene (TEP), 2,3,3,3-tetrafluoropropene, 1,2,3,3,3-pentafluoropropene, perfluoroalkyl vinyl ether (PAVE), vinylidene fluoride (VDF), hexafluoroisobutylene (HFIB). difluoroethylene, trifluoroethylene, and a mixture thereof.

The most important commercial fluoropolymers are polytetrafluoroethylene (PTFE), perfluorinated ethylene propylene copolymer (FEP), TFE-PDD (2,2-bistrifluoromethyl-4,5-difluoro-1,3-dioxole) copolymer (AF), polyperfluoroacrylate, poly(vinylidene fluoride) (PVDF), and polychlorotrifluoroethylene.

Perfluorinated polymer particles are obtained by homopolymerization or copolymerization in an aqueous emulsion or in an aqueous suspension [2]. The commercially available fluoropolymer with high fluorine contents have a specific size distribution of micron particles agglomerated by nanoparticles. Depending on polymerization conditions and the processes that follow polymerization, the nano/micron particle size, weight percentage, and agglomerate size distribution will greatly vary.

For example, DuPont provides PTFE powders under the Zonyl® trade name. MP 1000 has an average agglomerate size of 8-15 microns with a broad particle size distribution. MP 1100 has an average agglomerate size of 1.8-4 microns and a narrow particle size distribution. MP 1600 has a low molecular weight and is loosely agglomerated with an average agglomerate size of 4-12 microns. The final particle size of all MP series agglomerated powders can be reduced to about 200 nanometers.

The final nano/micro particle size distribution is dependent on de-agglomerate methods. High shear energy breaks down agglomerated particles into primary nanoparticles with high efficiency.

Preferred de-agglomeration methods include but are not limited to, wet mills (including ball, stirred media, centrifugal and jet mills), high pressure homogenizer, ultrasound sonicating bath, ultrasound probe sonicating, and ultrasonic disruptor. In the present invention, the preferred de-agglomerate step should be conducted in a solvent or polyfunctional fluorinated reactant-solvent media. Partially de-agglomerate micron particles of fluorinated polymer nano agglomerate have been obtained by ultrasonic probe or media mills.

Reactive Functional Fluoropolymer—for Fluorinated Segment

Fluorinated polymers are immiscible with common non-fluorinated organic, or polysiloxane. Such blends have separated phases. Fluorinated compounds cannot dissolve in organic solvent and cannot make coating or paint. For fluoropolymer soluble in common solvent, it must contain hydrocarbon oleophilic spacers in main chain or in pendent groups of molecule.

Fluorinated oligomers, polymers, copolymers and telechelics are known in the art [2, 12]. The functional group in fluorinated molecule can be located in the terminal of main chain, in side pendent groups, or both.

According present invention, in one embodiment, a fluorinated reactant with functional group selected from hydroxyl, hindered amino, or isocyanato is selected as functional fluorinated reactant. Since hydroxyl function group in fluorinated polymer can react with isocyanate group to form crosslink fluorinated polyurethane network. Amino function group in fluorinated polymer can react with isocyanate group to form crosslink fluorinated polyurea network. The reaction of primary amino group with isocyanato group is very fast under ambient temperature without catalyst. Since primary amino compounds are toxic, therefore, is not preferred. Secondary amine, especially steric hindered or blocked amine compounds have controlled reaction rate toward isocyanato group and have low toxicity, low viscosity, and is preferred. Aspartic ester amines have desired reaction rate controllable by catalyst, low toxicity and low viscosity. The hydroxyl-isocyanato or hindered amino-isocyanato reaction can be accelerated by organo-metallic homogeneous catalysts under ambient temperature or low temperature. Fluorinated polyurethane and polyurea are known having low surface energy. The phase of fluorinated urethane/urea segment is immiscible with siloxane segment. The fluorinated phase separates from siloxane phase. Fluorinated polyurethane/polyurea coatings are highly versatile and have superior properties such as UV resistance, weathering resistance, chemical resistance, abrasion resistance, and while also being flexible and adhering well to all kind of substrates.

Telechelic Functional (Hydroxyl, Hindered Amino, Alkylamino, Isocyanato) Fluorinated Reactant Preferred fluorinated functional reactant has terminal hydroxyl or pendent hydroxyl groups.

Preferred telechelic fluorinated compound has terminal (alpha, omega) functional groups. Commercial short fluorotelechelic diols, such as $HOCH_2(CF_2)_nCH_2OH$ with n=2, 4, 6, 8, 10 are available. Commercial functional PFPO perfluorinated polyether (PFPE) telechelic diols are also available. The fluorinated polyol resins derived from hexafluoroacetone (HFA), such as the mixture of 1,3-bis(3-hydroxyhaxafluoro-2-propyl)benzene and 1,4-bis(3-hydroxyhaxafluoro-2-propyl)benzene are also available. High fluorine content fluorotelechelic diols have low solubility in common solvent. They are preferred as low concentration additive for surface enrichment of fluorine-rich fluorinated reactant to reduce surface energy and increase anti-icing capability. According to the preferred embodiment of the invention, fluorinated polyol, fluorotelechelic diols, dialkylamines, fluorinated copolymer polyol having 2-perfluoroalkylethyl methacylate, 2-perfluoroalkylethyl acrylate, perfluoroalkylmethyl methacrylate, perfluoroalkylmethyl acrylate, hexafluoropropylmethyl methacrylate, and hexafluoropropylmethyl acrylate segments are preferred. These fluorinated terminal or telechelic functional polymers can be prepared also by controlled/living polymerization (C/LRP) with suitable functional initiator and following post modification. Such fluorinated terminal and telechelic functional polymers having hydrocarbon segments in main chain or in pendant groups are soluble in common solvent.

C/LRP is based on polymerization reactions capable of preventing the polymer chains from coupling or termination by transfer. It relies on reversible activation-deactivation processes between dormant chain and active chain. Controlled/living radical polymerization offers polymers of controlled composition, architecture, and very narrow molecular weight distribution by convenient radical polymerization. It provides routes to very narrow polydispersity and end-functional polymers to high purity block copolymers. Many C/LRP techniques have been developed including Atom Transfer Radical Polymerization (ATRP), Nitroxide Mediated Radical Polymerization (NMRP), Reversible Addition-Fragmentation chain Transfer (RAFT), Telluride-mediated Polymerization (TERP), and Iodine Transfer Polymerization (ITP). Cobalt Mediated Radical Polymerization (CMRP), and Organometallic Radical Polymerization (OMRP). The most promising method is ATRP. The most common catalyst in ATRP is $[Cu^I(bpy)_2]^+X^-$. The complex was formed in situ involving mixing $Cu^{II}$ halide and 2,2'-bipyridine. For example, in the presence hydroxyl functional alkyl bromide initiator and catalyst of $[Cu^I(bpy)_2]^+X^-$, ATRP of perfluoroalkylethyl methacrylate leads to alpha hydroxyl functional polyperfluoroalkylethyl methacrylate containing terminal brome. The brome atom can be displaced with hydroxyl group utilizing allyl alcohol. The two step synthesis prepares telechelic polyperfluoroalkylethyl methacrylate diol. Other fluorotelechelic functional diamines, dialkylamines, or diisocyanate also can be synthesized with suitable initiators and following post modification.

According to the preferred embodiment of the invention, Fluorotelechelic diols, diamines, dialkylamines, and diisocyanate, can be prepared by cationic ring-opening polymerization of fluoroalkyl cyclic ethers or fluoroalkyl cyclic ester. Preferred telechelic difunctional fluorinated polymers or oligomers are obtained by ring-opening polymerization of fluoroalkyl cyclic ethers or fluoroalkyl esters with functional initiation or end-capping. Preferred fluoroalkyl ether or ester is selected from the group consisting of fluoroalkyl epoxide, fluoroalkyl oxetane, fluoroalkyl furan, fluoroalkyl butyrolactone. Cyclic ethers including fluoroalkyl oxetane and fluoroalkyl furan, such as 2-(1,1,2,3,3,3-hexafluoropropyl) tetrahydrofuran, are polymerized by cationic ring-opening C/LRP which provide fluorinated polymer with telechelic hydroxyl functional group to the chain ends. Cationic ring-opening polymerization can be initiated by many available initiators, such as anhydrides of super acid such as trifluoromethane sulfonic acid, or fluorosulfonic acids. End-capping reaction by nucleophile reagent produces telechelic functional polymers. End-capping by potassium cyanate produces isocyanate group, end-capping by ammonia produces primary diamine group, end-capping by alkyl amine produces secondary amine group, and sodium hydroxide end-capping produces hydroxyl group.

Ring opening polymerizations of lactone and lactide cyclic esters with fluoroalkyl groups are preferred in present invention. Ring opening polymerization of cyclic esters can be performed by cationic, anionic, or pseudo anionic-coordination insertion mechanisms. A large variety of organometallic compounds have been developed as initiators or catalysts for coordination insertion living polymerization. The initiators avoiding transesterification, back-biting, macrocycle, and racemization are lanthanide alkoxides, aluminum tri-isopropoxide, Ti(II) alkoxides, and Ti(II) 2-ethylhexanoate. ABA tri-block elastomeric copolymers with well defined architecture can be synthesized. Hydroxyl, alkylamino, isocyanato functional groups of telechelic polyester are introduced either by functional initiation or end-capping of living polymers, or by a combination of the two methods.

Pendant Functional (Hydroxyl, Isocyanato) Fluorinated Reactant

In present invention, fluorinated polyols with pendent hydroxyl functional groups are preferred due to low cost commercial products. Fluorinated polyol based on Fluorinated Ethylene Vinyl Ether (FEVE) resins by copolymerization of fluoroolefin, such as chlorotrifluoroethylene (CTFE), with vinyl ether, such as cyclohexyl vinyl ether, are commercially available. Other non-commercialized FEVE or analog can be synthesized readily.

Isocyanato polyfunctional fluorinated prepolymer is not commercially available. One of present invention is to provide a synthesis method for isocyanato polyfunctional fluorinated prepolymer based on reaction fluorinated polyols with polyisocyanates.

According to the preferred embodiment of the invention, fluorinated polyol, having alternating sequence of oleophilic and oleophobic (fluorinated) spacers in molecular chain is synthesized by copolymerization of: (a) an fluorinated monomer being a fluoroolefin, (b) an oleophilic monomer being an aliphatic or cycloaliphatic oxygen-containing functional unsaturated monomer, and (c) a hydroxyl-containing monomer being an unsaturated derivative of a vinyl group-containing functional monomer [2, 12].

Synthesis of Polyfunctional Fluorinated Pendant Polyol

The process for preparing the fluorinated polyol carried out by polymerization which is known in the art [2, 12, 13]. In one embodiment of present invention the copolymerization of the corresponding monomers is conducted in organic solvents with very low water contents in the presence of a suitable initiator. The polymerization temperature is determined by half-life of the selected radical initiator. Polymerization temperature can be selected between −20° C. to 190° C., preferably between 40° C. to 120° C. The reaction pressure is between 1 to 100 Bars, preferably between 1 to 40 Bars. Copolymerization of unsaturated monomers containing fluorinated monomer is commonly initiated by a radical initiator of organic peroxide, inorganic peroxide, azo compound, or redox systems [13]. Azo compounds are common radical initiators, dialkyldiazenes, such as 2,2'-azobis (methylbutyronitrile), 1,1'-azobis (cyclohexanecarbonitrile), 2,2'-azobis (isobutyronitrile), 2,2'-azobis (2-methylpropionitrile), 4,4'-azobiz(4-cyanovaleric acid), 2,2'-azobis(2,4-dimethyl valeronitrile). It also suitable for initiate control/living polymerization when combine with reversible deactivation agent.

Among the various radical initiators, organic peroxides are popular. Commercial available organic peroxide compounds are selected from the group consisting of tert-amyl peroxide, diacyl peroxide, dialkyl peroxide, dialkylperoxydicarbonate, peroxyester, ketone peroxide, peroxydicarbonate, hydroperoxide, peroxyketal, and a mixture thereof.

Tert-amyl peroxides radical initiators provide the fluorocopolymer with chain linearity and narrow molecular weight distributions. Therefore, it is a preferred initiator choice. It includes: t-amyl peroxy-neodecanoate, t-amyl peroxy-neoheptaneoate, t-amyl peroxy-pivalate, t-amyl peroxy-2-ethylhaxanoate, t-amyl peroxy benzoate, t-amyl peroxy acetate, 1,1-di(t-amylperoxy)cyclohexane, 2,2-di(t-amylperoxy)propane, ethyl 3,3-di(t-amylperoxy)butyrate, di-t-amyl peroxide, and O,O-t-amyl O-(2-ethylhexyl)monoperoxy carbonate are preferred initiators.

The C/LRP also can be utilized for preparation of pendent hydroxyl functional fluoropolymers. The benefit by utilizing C/LRP is well defined polymer structures and architecture, very narrow polydispersity and end-functional polymers to high purity block copolymers. and therefore, low glass transition temperature and low viscosity of polymer solution. ITP is especially suitable for preparing fluorinated ABA and other block copolymers.

In present invention, the oleophobic monomer being a fluoroolefin is selected from the group consisting of tetrafluoroethylene (TFE), hexafluoropropylene (HFP), hexafluoroisobutylene (HFIB), vinylidene fluoride (VDF), difluoroethylene (DFE), trifluoroethylene (TFE), 3,3,3-trifluoropropene (TFP), 2,3,3,3-tetrafluoropropene, 1,2,3,3,3-pentafluoropropene, perfluoroalkyl vinyl ether (PAVE), hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture thereof; Perfluoroolefin has the highest oleophobic and chemical stability. Perfluoromethoxyvinyl ether, perfluoroalkylethyl vinyl ether, perfluoromethyl vinyl ether, perfluoropropyl vinyl ether and perfluoroalkylethyl acrylate are commercially available monomers. Perfluorinated olefin provides the fluorocopolymer with properties such as low surface energy, phase separation/segregation, chemical, thermal, and UV stability.

The pressure required during copolymerization is determined by the partial pressure of the fluorinated monomer and its solubility in the solvent-monomer mixture under the reaction temperature. Under such partial pressure, the fluorinated monomer sustains its concentration in the copolymerization system.

The preferred chemical structure of the present invention is a copolymer with an alternating sequence of fluorinated monomer and non-fluorinated monomer. The fluorinated copolymer with an alternated fluorinated and non-fluorinated sequence has superior structure stability with better chemical, oxidation, UV, and thermal resistance than a copolymer with random sequence structures. The copolymer with a block sequence has the least chemical stability against oxidation, UV, and high temperatures. A copolymer with an alternated sequence of fluoro-monomer and non-fluorinated monomer provides balanced oleophobic and oleophilic property has high solubility and low viscosity.

A fluorine atom or fluorinated electron-withdrawing substituents directly linked to the ethylene makes the fluorinated olefin a good electron acceptor; examples include tetrafluoroethylene (TFE), hexafluoropropylene (HFP), 3,3,3-trifluoropropene (TEP), 2,3,3,3-tetrafluoropropene, 1,2,3,3,3-pentafluoropropene, perfluoroalkyl vinyl ether (PAVE), vinylidene fluoride (VDF), and hexafluoroisobutylene (HFIB). TFE and HFP with an end group —$CF_2$=CF— bond are especially good electron acceptors.

Non-fluorinated monomers with an oxygen-containing functional group adjacent to the vinyl double bond, such as vinyl ether, vinyl ester, carbonate, and acrylate, provide an electron donor to the adjacent —$CH_2$=CH— ethylene group.

The copolymerization of electron deficient fluoroolefin unsaturated monomers with electron-rich, oxygen-containing functional non-fluorinated monomers is fast and yield is quantitative.

For example, copolymerization using fluoroolefin as an electron acceptor and vinyl ether as a electron donor forms copolymers with a complete alternated sequence. Therefore, vinyl ether, vinyl ester, carbonate, acrylate, and anhydride are the preferred non-fluorinated unsaturated aliphatic or cycloaliphatic monomers.

Functional monocyclic and polycyclic olefins having vinylene group in a ring and having oxygen-containing group adjacent to the vinylene group are preferred cyclic monomers. Copolymerization with cyclic monomers without ring-opening radical polymerization form linear copolymers with excellent chain flexibility and low glass transition temperatures. Cyclic vinylene ether, cyclic vinylene ester, cyclic vinylene carbonate, and cyclic vinylene anhydride are preferred cyclic monomers that can be used in the synthesis of hydroxyl functional fluoropolymers.

The preferred aliphatic or cycloaliphatic vinyl ether monomer is selected from the group consisting of ethyl vinyl ether, iso-butyl vinyl ether, n-butyl vinyl ether, tert-butyl vinyl ether, cyclohexyl vinyl ether, dodecyl vinyl ether, iso-propyl vinyl ether, tert-amyl vinyl ether, triethylene glycol methyl vinyl ether, 2-ethyl hexyl vinyl ether, ethylene glycol butyl vinyl ether, 2-propyl heptanol vinyl ether, adamantyl vinyl ether, norbonyl vinyl ether, and a mixture thereof. Vinyl ether with branched aliphatic ether groups is preferred since it provides the lowest viscosity even under low temperatures. Therefore, tert-butyl vinyl ether, tert-amyl vinyl ether, iso-butyl vinyl ether, cyclohexyl vinyl ether, 2-ethyl hexyl vinyl ether, adamantyl vinyl ether, norbonyl vinyl ether, dihydrofuran, 3,4-dihydro-2H-pyran, and oxanorburnene are preferred.

The preferred unsaturated aliphatic and cycloaliphatic vinyl ester is selected from the group consisting of vinyl acetate, vinyl cyclohexanecarboxylic acid ester, vinyl 1,3-dioxolan-2-one, vinyl neodecanoate, vinyl propionate, vinyl butanate, vinyl isobutyrate, vinyl 2-methyl propanoate, vinyl tert-butyrate, vinyl isovalerate, vinyl 3-methyl butyrate, vinyl versatate, vinyl isobutyrate, vinyl pivalate, vinyl caproate, vinyl 2-metyl pentanoate, vinyl trifluoroacetate, and a mixture thereof. Vinyl ester with branched aliphatic acid groups is preferred since it provides the lowest viscosity under low temperatures. Therefore, vinyl tert-butyrate, vinyl versatate, and vinyl isovalerate are preferred.

The preferred unsaturated aliphatic and cycloaliphatic acrylate is selected from the group consisting methyl acrylate, ethyl acrylate, propyl acrylate, butyl acrylate, iso-butyl acrylate, tert-butyl acrylate, amyl acrylate, tert-amyl acrylate, 2-ethylhexyl acrylate, lauryl acrylate, cyclohexyl acrylate, stearyl acrylate, methyl methacrylate, ethyl methacrylate, propyl methacrylate, butyl methacrylate, iso-butyl methacrylate, tert-butyl methacrylate, amyl methacrylate, tert-amyl methacrylate, 2-ethylhexyl methacrylate, lauryl methacrylate, cyclohexyl methacrylate, stearyl methacrylate, and a mixture thereof. Acrylates with branched aliphatic ester groups are preferred since they provide the lowest viscosity under low temperatures. Therefore, tert-butyl acrylate, tert-amyl acrylate, cyclohexyl acrylate, tert-butyl methacrylate, tert-amyl methacrylate, cyclohexyl methacrylate are preferred acrylate units.

A preferred acrylate is acrylate with fluorinated alky group. The preferred vinyl ether is the vinyl ether with fluorinated alkyl group. The preferred vinyl ester is the vinyl ester with fluorinated ester. The copolymer with acrylate, vinyl ether or vinyl ester having fluorinated alkyl provides low surface energy and high degrees of compatibility with fluorinated oligomer or fluoropolymer with high fluorine content.

There are limited vinyl carbonates available: 1,3 vinyl-dioxolan-2-one, and vinylene carbonate. Choices for commercially available vinyl anhydride are maleic anhydride, itaconic anhydride, and citraconic anhydride.

Vinyl monomer of acrylonitrile, vinylidene cyanide also can be used.

For introducing pendant hydroxyl functional groups into polymer chain, the hydroxyl-containing functional monomer must be used as copolymerization monomer. The preferred hydroxyl-containing functional is selected from the group consisting of hydroxyalkyl vinyl ether, hydroxyalkyloxy vinyl ether, hydroxycyclohexyl vinyl ether, hydroxyalkyl acrylate, hydroxyalkyloxy acrylate, hydroxycyclohexyl acrylate, hydroxyalkyl carboxylic vinyl ester, hydroxyalkyloxy carboxylic vinyl ester, and a mixture thereof.

The preferred hydroxyl functional unsaturated monomer is selected from the group consisting of hydroxybutyl vinyl ether, diethylene glycol monovinyl ether, 4-(hydroxymethyl)cyclohexyl methyl vinyl ether, hydroxyethyl acrylate, hydroxypropyl acrylate, hydroxybutyl acrylate, 2-ethyl hydroxyethyl acrylate, hydroxymethyl-cyclohexyl acrylate, hydroxyethyl methacrylate, hydroxypropyl methacrylate, hydroxybutyl methacrylate, 2-ethyl hydroxyethyl methacrylate, butanediol monoacrylate, hydroxybutyric acid vinyl ester, hydroxydecanoic acid vinyl ester, hydroxydodecanoic acid vinyl ester, hydroxyhaxadecanoic acid vinyl ester, hydroxyhexanoic acid vinyl ester, and a mixture thereof.

Since crosslink network of fluorinated polyurethane is targeted. Geometric unblocked hydroxyl groups are easily accessible by crosslink reactant. Therefore, hydroxybutyl vinyl ether, diethylene glycol monovinyl ether, hydroxypropyl acrylate, hydroxybutyl acrylate, hydroxybutyl methacrylate, butanediol monoacrylate, hydroxybutyric acid vinyl ester, hydroxyhexanoic acid vinyl ester are the preferred unsaturated hydroxyl functional units.

In a preferred embodiment, a controlling/living radical polymerization is used. If catalyst is sensitive to the presence of hydroxyl group, prior to polymerization hydroxyl group is protected by silylation. Many silylating agents can be used and the most economic is trimethylchlorosilane (TMCS) in combination with triethylamine as base. The silylation is carry out in solvent, and the triethylamine hydrochloride salt formed is filtered out. After polymerization, trimethylsilyl group can be easily cleaved from hydroxyl group by acidic or basic hydrolysis easily. Wet solvent can be dehydrated by molecular sieve easily, such as 3A or 4A molecular sieve.

Copolymerization can be conducted in a solvent or water medium. Since the application of the present invention is targeted for form polyurethane crosslink network, a water-free, urethane grade solvent medium is preferred. The same solvent will be used in the formulation the catalytic reaction composition for making anti-icing coating.

Chain transfer agents provide molecular weight control, colorless final product and reduced gel. Because the high reactivity of fluorinated active chain towards electron-rich hydrocarbons, any type of organic compounds can act as a chain transfer agent. The use chain transfer agent not only reduces the average molecular weight, but also reduces the polydispesity index which is undesirable. $C_3$-$C_5$ saturated hydrocarbon in 1-0.05% amount of total monomer, are preferred chain transfer agent.

According to a preferred embodiment of the invention: a hydroxyl functional linear alternative fluorinated copolymer is synthesized by copolymerization of monomers comprising of (a) fluorinated units being fluoroolefins, (b) oleophilic units being unsaturated oxygen-containing aliphatic or cycloaliphatic monomers, (c) hydroxyl functional units being hydroxyl functional unsaturated monomers.

In this invention in a preferred embodiment, the mole ratio of fluoroolefin to non-fluorinated monomer in the hydroxyl polyfunctional alternative fluorinated copolymer is between 0.9:1 to 1.1:1, and more preferred ratio is 1:1.

Siloxane Modified Polyfunctional Fluorinated Pendant Polyol

According to a preferred embodiment of the invention: a hydroxyl functional siloxane modified fluorinated copolymer is synthesized by copolymerization of monomers comprising of (a) fluorinated units being fluoroolefins, (b) oleophilic units being unsaturated oxygen-containing aliphatic or cycloaliphatic monomers, (c) siloxane functional units being unsaturated siloxane functional aliphatic or cycloaliphatic monomers, (c) hydroxyl functional units being hydroxyl functional unsaturated monomers.

In this invention in a preferred embodiment, the mole ratio of fluoroolefin to non-fluorinated monomer in the hydroxyl polyfunctional alternative fluorinated copolymer is between 0.9:1 to 1.1:1, and more preferred ratio is 1:1.

In present invention, polysiloxane modified polyfunctional fluorinated pendant polyol is preferred, the oleophobic monomer being a fluoroolefin is selected from the group consisting of tetrafluoroethylene (TFE), hexafluoropropylene (HFP), hexafluoroisobutylene (HFIB), vinylidene fluoride (VDF), difluoroethylene (DFE), trifluoroethylene (TFE), 3,3,3-trifluoropropene (TFP), 2,3,3,3-tetrafluoropropene, 1,2,3,3,3-pentafluoropropene, perfluoroalkyl vinyl ether (PAVE), hexafluoropropylene oxide, hydropentafluoropropylene, perfluoromethyl vinyl ether, perfluoromethoxyvinyl ether, perfluoropropyl vinyl ether, perfluoroalkylethyl methacrylate, perfluoroalkylethyl acrylate, and a mixture Non-fluorinated monomers with an oxygen-containing functional group adjacent to the vinyl double bond, such as vinyl ether, vinyl ester, carbonate, and acrylate and their mixture are used as major non-fluorinated monomers.

The preferred hydroxyl-containing functional monomer is selected from the group consisting of hydroxyalkyl vinyl ether, hydroxyalkyloxy vinyl ether, hydroxycyclohexyl vinyl ether, hydroxyalkyl acrylate, hydroxyalkyloxy acrylate, hydroxycyclohexyl acrylate, hydroxyalkyl carboxylic vinyl ester, hydroxyalkyloxy carboxylic vinyl ester, and a mixture thereof.

The minor non-fluorinated monomer used for copolymerization is acrylate functional siloxane or methacrylate functional siloxane containing polysiloxane group with low molecular weight (400-10,000). The preferred vinyl ether is the vinyl ether containing polysiloxane with low molecular weight. The preferred vinyl ester is the vinyl ester containing polysiloxane with low molecular weight. The copolymer with acrylate, vinyl ether or vinyl ester having siloxane group provides low surface energy and high degrees of compatibility with polysiloxane. The example of siloxane functional (meth)acrylate monomers are methacryloxypropyl terminated polydimethylsiloxane, acryloxypropyl terminated polydimethylsiloxane, methacryloxypropyltris (trimethylsiloxy) silane, methacryloxypropyl pentamethyldisiloxysilane, methacyloxypropyltris (pentamethyldisiloxanyl) silane. The example of vinylsiloxane monomer is vinyl terminated polydimethylsiloxane.

The molar ratio of major non-fluorinated monomers to minor non-fluorinated siloxane functional monomers is about 1:1 to 5:1, and preferred 2:1 to 3:1.

Hydroxyl Polyfunctional Fluoropolyol with High Fluorine Contents—for Low Surface Energy Since polyfunctional fluorinated polymer with high fluorine content can also form crosslink network and has higher durability, therefore, preferred. Hydroxyl polyfunctional group of fluorinated polyol can form crosslink polyurethane network, therefore, hydroxyl polyfunctional fluorinated copolymer is preferred as fluorocopolymer with high fluorine content.

The double bond —CF$_2$=CF$_2$— in fluorinated olefin is electron acceptor. The vinyl double bond —CH$_2$=CH— adjacent to oxygen-containing functional group in non-fluorinated monomer is electron donor.

In present invention in a preferred embodiment, a convenient technique to increase fluorine content is based on starved feed of electron donor: non-fluorinated monomers.

In other embodiment, a convenient technique to increase fluorine content is base on the addition of perfluoroalkylethyl methacrylate or perfluoroalkylethyl acrylate as a copolymerization ingredient of non-fluorinated monomers.

According to a preferred embodiment of the invention: fluoropolymer with high fluorine content is selected from a hydroxyl polyfunctional fluorinated copolymer which is synthesized by copolymerization of monomers comprising of (a) fluorinated monomer, and starved feed of (b) unsaturated oxygen-containing aliphatic or cycloaliphatic monomers, and (c) hydroxyl functional units being hydroxyl functional unsaturated monomers, The mole ratio of fluorinated to non-fluorinated monomer in the hydroxyl functional fluorinated polymer with high fluorine content is greater than 2:1.

A linear hydroxyl polyfunctional fluorinated copolymer-fluorinated polyol with high fluorine content wherein a fluorinated monomer is selected from the group consisting of tetrafluoroethylene, hexafluoropropylene, hexafluoroisobutylene, vinylidene fluoride, difluoroethylene, trifluoroethylene, 3,3,3-trifluoropropene, 2,3,3,3-tetrafluoropropene, 1,2,3,3,3-pentafluoropropene, hydropentafluoropropylene, fluoroalkyl vinyl ether, perfluoromethoxyvinyl ether, perfluoromethyl vinyl ether, perfluoropropyl vinyl ether, fluorinated methacrylate, fluorinated acrylate, fluorinated styrene, fluorinated tetrahydrofuran, fluorinated oxetane, and a mixture thereof;

A linear hydroxyl polyfunctional fluorinated copolymer with high fluorine content wherein aliphatic or cycloaliphatic oxygen-containing functional monomer is selected from the group consisting of:

(a) vinyl ether selected from the group consisting of ethyl vinyl ether, iso-butyl vinyl ether, n-butyl vinyl ether, tert-butyl vinyl ether, cyclohexyl vinyl ether, dodecyl vinyl ether, octadecyl vinyl ether, iso-propyl vinyl ether, tert-amyl vinyl ether, triethylene glycol methyl vinyl ether, 2-ethyl hexyl vinyl ether, ethylene glycol butyl vinyl ether, 2-propyl heptanol vinyl ether, adamantyl vinyl ether, norbonyl vinyl ether, dihydrofurane, dihydropyran, and a mixture thereof;

(b) vinyl ester selected from the group consisting of vinyl acetate, vinyl cyclohexanecarboxylic acid ester, vinyl neo-decanoate, vinyl propionate, vinyl butanate, vinyl isobutyrate, vinyl 2-metyl propanoate, vinyl tert-butyrate, vinyl isovalerate, vinyl 3-methyl butyrate, vinyl versatate, vinyl isobutyrate, vinyl pivalate, vinyl caproate, vinyl 2-metyl pentanoate, vinyl trifluoroacetate, perfluoroalkylethyl vinyl ether, and a mixture thereof;

(c) acrylate selected from the group consisting of methyl acrylate, ethyl acrylate, propyl acrylate, butyl acrylate, iso-butyl acrylate, tert-butyl acrylate, amyl acrylate, tert-amyl acrylate, 2-ethylhexyl acrylate, lauryl acrylate, cyclohexyl acrylate, stearyl acrylate, methyl methacrylate, ethyl methacrylate, propyl methacrylate, butyl methacrylate, iso-butyl methacrylate, tert-butyl methacrylate, amyl methacrylate, tert-amyl methacrylate, 2-ethylhexyl methacrylate, lauryl methacrylate, cyclohexyl methacrylate, hexafluorobutyl acrylate, hexafluorobutyl methacrylate, dodecafluoroheptyl acrylate, dodecafluoroheptyl methacrylate, perfluoroalkylethyl methacrylate, perfluoroalkylethyl acrylate, stearyl methacrylate, 2-isocyanatoethyl methacrylate, 2-isocyanatoethyl acrylate, and a mixture thereof;

(d) vinyl carbonate selected from the group consisting of 1,3 vinyl-dioxolan-2-one, vinylene carbonate, and a mixture thereof;

(e) vinyl anhydride selected from the group consisting of maleic anhydride, itaconic anhydride, citraconic anhydride, and a mixture thereof;

(f) acrylonitrile, 2-cyanoacrylate, and vinylidene cyanide; and, (g) functional cyclic monomer selected from the group consisting of dihydrofuran, 3,4-dihydro-2H-pyran, oxanorburnene, tetrahydrofuran, oxetane, and a mixture thereof.

A linear hydroxyl polyfunctional fluorinated copolymer with high fluorine content wherein a hydroxyl-containing functional monomer is selected from the group consisting of hydroxybutyl vinyl ether, diethylene glycol monovinyl ether, 4-(hydroxymethyl)cyclohexyl methyl vinyl ether, hydroxyethyl acrylate, hydroxypropyl acrylate, hydroxybutyl acrylate, 2-ethyl hydroxyethyl acrylate, hydroxymethylcyclohexyl acrylate, hydroxyethyl methacrylate, hydroxypropyl methacrylate, hydroxybutyl methacrylate, 2-ethyl hydroxyethyl methacrylate, butanediol monoacrylate, hydroxybutyric acid vinyl ester, hydroxydecanoic acid vinyl ester, hydroxydodecanoic acid vinyl ester, hydroxyhaxadecanoic acid vinyl ester, hydroxyhexanoic acid vinyl ester, and a mixture thereof.

Reactive Polyfunctional Siloxane—for Segregated Siloxane Segment

According to preferred embodiment, an object of this invention is to provide siloxane segment comprising at least a polyfunctional polysiloxane reactant having at least a reactive group selected from the group consisting of aminoalkyl, carbinol, silanol, hydride, isocyanato and a mixture thereof. An object of this invention is to provide a polyfunctional polysiloxane reactant having reactive functional groups with the capability to:

(a) having low surface energy;
(b) soluble in selected organic solvent or a mixture of solvents for fluorinated polyol; (C) reactive to form crosslink siloxane-containing network;
(d) crosslink reaction of reactive siloxane can be accelerated by same organo-metallic catalyst used for form fluorinated urethane/urea network under ambient temperature;
(e) phase of siloxane segment separates from fluorinated and urethane/urea segments;
(f) phase of crosslink network of siloxane and phase of crosslink network of fluorinated each other interpenetrate and segregate;
(g) interpenetrating crosslink network freezing morphology pattern of phase segregation by catalytic reaction front;
(h) provide UV, chemical, corrosion, thermal, oxidation resistance and water barrier.

Siloxane polymer/oligomer is known in the arts [1]. Reactive polysiloxanes, such as siloxane having hydride, silanol, aminoalkyl, carbinol are commercial products. Most of reactive siloxanes are soluble in the ketones, esters, tetrahydrofuran, N,N-dimethylformamide, N,N-dimethylacetamide, 1-methyl-2-pyrrolidone, dimethyl sulfoxide, xylene, and other common hydrocarbon solvents.

Hydride Siloxane—Polyfunctional Siloxane Reactant

Hydride functional group of siloxanes undergoes catalytic dehydrogenetic coupling reaction with silanol functional siloxane to form siloxane chain in the presence of organo-metallic catalysts.

Hydride functional siloxane undergoes catalytic addition hydrosilylation with vinyl functional siloxane catalyzed by platinum complex.

According present invention hydride functional siloxane reacting with silanol functional siloxane or reacting with vinyl functional siloxane is used for form segregated siloxane segment.

Two classes of hydride functional siloxanes are preferred: terminal and pendant.

Preferred hydride siloxanes of present invention are as following: hydride terminated polymethylsiloxane having molecular weight from 1,000 to 28,000; trimethylsiloxy terminated copolymer of methylhydrosiloxane-dimethylsiloxane having molecular weight of 1,900 to 60,000; hydride terminated copolymer of methylhydrosiloxane-dimethylsiloxane having molecular weight of 2,000 to 2,600; and trimethylsiloxy terminated polymethylhydrosiloxane having molecular weight of 1,400-2,400

Silanol Siloxane—Polyfunctional Siloxane Reactant

Silanol functional siloxane undergoes dehydrogenetic coupling with hydride functional siloxane. Organometallic complexes, such as organotin, organozinc, organoirin and variety of many other catalyzed dehydrogenetic coupling. According present invention silanol functional siloxanes are preferred as reactive siloxane with hydride siloxane in the scope of this invention. The siloxane crosslink network formed by reaction of hydride siloxane with silanol functional siloxane has low surface energy. Crosslinked siloxane segment separated from crosslink network of fluorinated segment. Hydrogen released by dehydrogenetic coupling provides foamed structure.

In one preferred embodiment equal molar hydride siloxane and silanol siloxane are selected as polyfunctional siloxane reactants in catalytic reaction composition. Preferred silanol siloxane of present invention is as following: silanol terminated polymethylsiloxane having molecular weight from 700-1500, 2,000, 4,000, 8,000, 10,000; and silanol terminated polytrifluoropropylmethylsiloxane having molecular weight of 550-1,200.

Carbinol Terminated Siloxane—Polyfunctional Siloxane Reactant

The term carbinol refers to hydroxyl group bonds to carbon (C—OH) to differentiate them from hydroxyl group bonds to silicon (Si—OH). Carbinol group in hydroxyalkyl siloxane reacts with isocyanato group to form urethane link. According present invention carbinol functional siloxanes are preferred as polyfunctional siloxane reactant for provide phase segregated siloxane segment and for urethane crosslink network in the scope of this invention. Carbinol functional siloxane selected includes linear terminated carbinol siloxane and pedant carbinol siloxane.

Special preferred carbinol siloxane of present invention is as following: hydroxypropyl terminated polydimethylsiloxanes having molecular weight 1000, 2000, 3000, 4000, 5000, and 8000; hydroxyethyoxypropyl terminated polydimethylsiloxane having molecular weight 2000, 4000, 5000 and 8000; hydroxyhexyl terminated polydimethylsiloxane having molecular weight 2000, 4000, 5000, and 8000; hydroxybutyl terminated polydimethylsiloxane having molecular weight 2000, 3000, 4000, 5000, and 8000; hydroxypentyl terminated polydimethylsiloxane having molecular weight 2000, 3000, 4000, 5000 and 8000; and hydroxyhexyl terminated polydimethylsiloxane having molecular weight 2000, 3000, 4000, 5000 and 8000.

Aminoalkyl Terminated Siloxane—Polyfunctional Siloxane Reactant

Amino group in aminoalkyl siloxane reacts with isocyanato group to form urea link. According present invention aminoalkyl functional siloxanes are preferred as polyfunctional siloxane reactant for provide phase segregated siloxane segment and for urea crosslink network in the scope of this invention. Aminoalkyl functional siloxane selected includes linear terminated aminoalkyl siloxane. Special preferred aminoalkyl siloxane of present invention is as following: aminopropyl terminated polydimethylsiloxanes having molecular weight from 900-1000, 2000, 3000, 4000, 5000; aminohexyl terminated polydimethylsiloxane having molecular weight of 2000, 3000, 4000, 5000, 8000, and 10,000; ethylpiperazine terminated polydimethylsiloxane having molecular weight in 2000, 3000, 4000, 5000, 8000 and 10,000; alpha, omega-di[(N-ethyl)amino(2-methyl)propyl]polydimethylsiloxane having molecular weight in 2000, 3000, 4000, 5000, 8000 and 10,000; and alpha, omega-di [(N-methyl)amino(2-methyl)propyl]polydimethylsiloxane having molecular weight in 2000, 3000, 4000, 5000, 8000 and 10,000.

Polyaspartic Ester Amine Terminated Siloxane-Polyfunctional Siloxane Reactant

In a preferred embodiment, according present invention, secondary amine of siloxane reactant-polyaspartic ester amine terminated siloxane is selected as reactive polyfunctional siloxane polymer. Since secondary amine group in silicone polyaspartic ester amine reacts with isocyanato group to form crosslink urea link with controlled rate by organo-metallic homogeneous catalysts under ambient temperature or low temperature. The microphase of polyurea crosslink network separates from siloxane and fluorinated segments.

In present invention, crosslink reaction between polyaspartic ester amine terminated siloxane with isocyanato polyfunctional co-reactant, including isocyanato polyfunctional fluorinated prepolymer is preferred.

Aliphatic polyaspartic ester amines are commercially available. Those polyaspartic ester amine are based on 1,2-diaminopropane, 1,4-diaminobutane, 1,6-diaminohexane, 2,5-dimethylhexane, 1,11-diaminoudecane, 1,12-diaminododecane, polypropylene oxide diamine, 4,4'-methylenebis(cyclohexyl amine), 3,3'-dimethyl-4,4'-didiaminocyclohexyl methane, isophorone diamine (1-amino-3-aminomethyl-3,5,5-trimethyl-cyclohaxane), hexamethylene diamine, tetrahydro-2,4-diaminotuluene, tetrahydro-2,6-diaminotuluene, polyoxyalkylene diamine, bis(4-aminocyclohexyl)methane adduct, bis(4-amino, 3-methylcyclohexyl)methane, 3,4-aminomethyl-1-methylcyclohexylamine.

Polyaspartic ester amine with siloxane main chain is not a commercial product. Present invention provides synthesis method of polyaspartic ester amine terminated siloxane by reaction of aminoalkyl terminal siloxane polymer/oligomer or pendent aminoalkyl polysiloxane with excess dialkyl fumarates or dialkyl maleates via Michael addition. Suitable dialkyl maleates include but not limited to diethyl maleate, dipropyl maleate, dibutyl maleate, methyl propyl maleate, ethyl propyl maleate. Suitable dialkyl fumarates include diethyl fumarate, dipropyl fumarate, dibutyl fumarate, methyl propyl fumarate, ethyl propyl fumarate. Suitable diamines are aminoalkyl terminated polysiloxane including 1,3-bis(3-aminoalkylpropyl)tetramethyldisiloxane, alpha, omega-bis(aminopropyl)polysiloxane, and alpha, omega-(3-aminopropyl)polydimethylsiloxane.

Aliphatic Polyfunctional Polyol, Polyamine, Isocyanate Prepolymer—Aliphatic Reactant Polyfunctional aliphatic reactants: aliphatic polyols and aliphatic polyalkylamines are commercial products. They can be directly added in catalytic reaction system as polyol or polyamine part, or first to covert to either polyol prepolymer or polyisocyanate prepolymer part as starting material.

A polyfunctional aliphatic reactant is selected from the group consisting of aliphatic polyol, aliphatic polyalkylamine, and a mixture thereof. Aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether)glycol, castor polyol, vegetable polyol, and a mixture thereof.

Present invention provides a synthesis method of polyfunctional isocyanate prepolymer based on reactions between polyfunctional aliphatic polyol with excess diisocyanate to form isocyanato terminated intermediate, i.e. a prepolymer. The diisocyanate selected is isophorone diisocyanate (IPDI), 4,4'-diisocyanato dicyclohexylmethane (HMDI), 1,6-diisicyanato hexamethylene (HDI), and a mixture thereof.

Aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof.

In other embodiment, present invention provides a synthesis methods of polyfunctional isocyanate prepolymer based on reactions between polyfunctional polyalkylamine with excess diisocyanate to form isocyanato terminated intermediate, i.e. a prepolymer. The diisocyanate selected is isophorone diisocyanate (IPDI), 4,4'-diisocyanato dicyclohexylmethane (HMDI), 1,6-diisicyanato hexamethylene (HDI), and a mixture thereof.

Aliphatic Polyfunctional Isocyanate—Crosslink Co-Reactant

Since anti-icing coatings are used outdoor, it must have UV and weathering resistance. Therefore, aliphatic polyfunctional isocyanates are required in present invention. Suitable aliphatic polyfunctional isocyanate is selected from the group consisting of (1) monomeric diisocyanate comprising 1,6-diisocyanato hexamethylene (HDI), isophorone diisocyanate (IPDI, 1-isocyanato-3-isocyanatomethyl-3,5,5-trimethyl-cyclohexane), 1,4-cyclohexylene diisocyanate, 1,4-tetramethylene diisocyanate, 1,5-pentamethylene diisocyanate, 1,7-heptamethylene diisocyanate, 2,2,4- and 2,4,4-trimethylhexamethylene diisocyanate, 2,2,4-trimethyl-1,6-hexamethylylene diisocyanate (TMDI), 1,10-decamethylene diisocyanate, 4,4'-diisocyanato dicyclohexylmethane ($H_{12}$MDI, or HMDI), norbornane diisocyanate (NDI); (2) oligomeric polyisocyanate comprising aliphatic polyisocyanates based on hexamethylene diisocyanate, hexamethylene diisocyanate biuret, hexamethylene diisocyanate trimer, aliphatic polyisocyanates based on isophorone diisocyanate, aliphatic polyisocyanates based on 4,4'-diisocyanato dicyclohexylmethane; (3) polyfunctional isocyanate prepolymer comprising aliphatic polyfunctional isocyanate prepolymer based on isocyanato terminated polyether prepolymer, polyfunctional isocyanato terminated polyester prepolymer, polyfunctional isocyanato terminated polycarbonate prepolymer, polyfunctional isocyanato terminated polycaprolactone prepolymer, polyfunctional isocyanato fluorinated prepolymer; polyfunctional isocyanato polysiloxane prepolymer; (4) modified polyisocyanate comprising of carbodiimide, urededione, and a mixture thereof.

Aliphatic polyisocyanate resin and isocyanate prepolymers based on hexamethylene diisocyanate (HDI), HDI biuret, HDI trimer, isophorone diisocyanate (IPDI), 4,4'-diisocyanato dicyclohexylmethane ($H_{12}$MDI, or HMDI) offer environmental friendly, friendly to handle, fast curing, and longer pot life. Many commercial products of aliphatic polyisocyanates based on HDI, IPDI, and HMDI aliphatic polyfunctional isocyanate prepolymer, such as polyfunctional isocyanato terminated polyether prepolymer, polyfunctional isocyanato terminated polyester prepolymer, polyfunctional isocyanato terminated polycarbonate prepolymer, polyfunctional isocyanato terminated polycaprolactone prepolymer are available. The aliphatic isocyanate, polyisocyanate and isocyanato terminated prepolymers are useful in present invention.

Polyfunctional Isocyanato Fluorinated Prepolymer—Crosslink Co-Reactant

Polyfunctional isocyanato terminated fluorinated prepolymers in various viscosities are useful for provide anti-icing property in present invention.

Present invention provides synthesis methods of polyfunctional fluorinated isocyanato prepolymer. The method is based on the reaction of polyfunctional fluorinated polyol with excess diisocyanate to form isocyanato terminated intermediate, i.e. a prepolymer. The diisocyanate selected is isophorone diisocyanate (IPDI), 4,4'-diisocyanato dicyclohexylmethane (HMDI), 1,6-diisicyanato hexamethylene (HDI), and a mixture thereof.

Polyfunctional Isocyanato Siloxane Prepolymer—Crosslink Co-Reactant

Polyfunctional isocyanato terminated polysiloxane prepolymer in various viscosities are useful for provide excellent anti-icing property in present invention.

Present invention provides a synthesis method of polyfunctional polysiloxane isocyanato prepolymer based on reactions between polyfunctional carbinol polysiloxane with excess diisocyanate to form isocyanato terminated intermediate, i.e. a prepolymer. The diisocyanate selected is isophorone diisocyanate (IPDI), 4,4'-diisocyanato dicyclohexylmethane (HMDI), 1,6-diisicyanato hexamethylene (HDI), and a mixture thereof.

In other embodiment, present invention provides a synthesis methods of polyfunctional polysiloxane isocyanato prepolymer based on reactions between polyfunctional aminoalkyl polysiloxane with excess diisocyanate to form isocyanato terminated intermediate, i.e. a prepolymer. The diisocyanate selected is isophorone diisocyanate (IPDI), 4,4'-diisocyanato dicyclohexylmethane (HMDI), 1,6-diisicyanato hexamethylene (HDI), and a mixture thereof.

Optional Additive—Chain Extender

In present invention low molecular weight diol, triol as chain extender is useful for provide improved mechanical properties, such as tension strength, elongation, tear strength, compression set, and abrasion resistance.

The amount of chain extender preferred is used in the range of few parts per hundred based on total solid contents. The chain extender is selected from the group consisting of 1,4-butanediol (BDO), 2-ethyl-1,3-hexanediol (EHD), 2-butyl-2-ethyl-1,3-propanediol (BEPG), 2,2,4-trimethyl-1,3-petanediol (TMPD), 1,6-hexanediol (HG), diethylene glycol (DEG), trimethylol propane, polytetramethylene ether glycol (Polymeg polyol), polycaprolactone, polyethylene propylene adipate glycol, polybutylene adipate glycol, poly (tetramethylene ether)glycol (PTMEG), polycaprolactone, Optional Additive—Functional Fluorine-Rich Reactant—for Surface Fluorine Enrichment In present invention, addition of functional fluorine-rich reactant into main composition of interpenetrating polymer network coating composition increase fluorine contents in surface layer. The amount of surface fluorine enrichment additive is in the range of few pats per thousands based on total solid contents.

Preferred functional fluorine-rich reactant has terminal hydroxyl or pendent hydroxyl groups.

Preferred fluorinated compound has one terminal (alpha) functional group, or telechelic terminals (alpha, omega) functional groups. Low molecular weight hydroxyl fluorine-rich reactant immigrates and enriches into surface layer easily. Fluorinated alcohol reacts with isocyanate to form urethane links as an integrated part of interpenetrating polymer network with fluorine enrichment in surface layer.

Linear perfluoroalkylethyl alcohols with low molecular weights as a mixture are commercially available under the name of fluorotelomer alcohol. Fluorotelomer alcohol contains 2-perfluorohexylethyl alcohol, 2-perfluorooctylethyl alcohol, 2-perfluorodecylethyl alcohol, 2-perfluorododecylethyl alcohol, 2-perfluorotetradecylethyl alcohol, 2-perfluorohexadecylethyl alcohol.

Short fluorotelechelic diols, such as $HOCH_2(CF_2)_n CH_2OH$ with n=2, 4, 6, 8, 10 are commercially available. Hydroxyl functional PFPO and PFPE telechelic diols are also commercially available. The fluorinated polyol resins derived from hexafluoroacetone (HFA), such as the mixture of 1,3-bis(3-hydroxyhaxafluoro-2-propyl)benzene and 1,4-bis(3-hydroxyhaxafluoro-2-propyl)benzene are also available.

According to the preferred embodiment of the invention, fluorine-rich polyol oligomer is also preferred as surface fluorine enrichment additive. Fluorine rich polyol oligomer is synthesized by copolymerization monomers comprising of: (a) a fluorine-rich monomer, (b) an oleophilic monomer being an aliphatic or cyclo-aliphatic oxygen-containing functional unsaturated monomer, and (c) a hydroxyl-containing monomer being an unsaturated derivative of a vinyl group-containing functional monomer.

A preferred fluorine-rich monomer is selected from the group consisting of (1) perfluoroalkyl acrylate; (2) perfluoroalkyl vinyl ether (PAVE); and a mixture thereof.

The monomer of perfluoroalkyl acrylate is selected from the group consisting of perfluorooctylethyl acrylate, perfluorooctylethyl methacylate, perfluorohexylethyl acrylate, perfluorohexylethyl methacrylate, perflurorobutylethyl acrylate, perfluorobutylethyl methacylate, perfluoropropylethyl acrylate, perfluoropropylethyl methacrylate, perfluoropropylmethyl acrylate, perfluoropropylmethyl methacrylate, perfluoroethylethyl acrylate, perfluoroethylethyl methacrylate, perfluoroethylmethyl acrylate, perfluroroethylmethyl, methacrylate, perfluoromethylethyl acrylate, perfluoromethylethyl acrylate, perfluromethylmethyl acrylate, perfluromethylmethyl methacrylate, and a mixture thereof.

The monomer of perfluoroalkyl vinyl ether is selected from the group consisting of perfluorooctylethyl vinyl ether, perfluorooctylmethyl vinyl ether, perfluorohexylethyl vinyl ether, perfluorohexylmethyl vinyl ether, perflurorobutylethyl vinyl ether, perfluorobutylmethyl vinyl ether, perfluoropropylethyl vinyl ether, perfluoropropylmethyl vinyl ether, perfluoropropylmethoxy vinyl ether, perfluoroethylethyl vinyl ether, perfluoroethylmethyl vinyl ether, perfluoromethylethyl vinyl ether, perfluroromethylmethyl vinyl ether, perfluoromethoxy vinyl ether, and a mixture thereof.

Catalyst—Tertiary Amine and Organometallic

Tertiary amines are very active catalyst for cross-linking reaction of hydroxyl and isocyanato groups. Most common tertiary amine catalysts are triethylamine, triethylenediamine, 1,4-diazabicyclo[2,2,2]octane, N,N-dimethylcyclohexylamine, dimethylethanolamine, bis[2-dimethylaminoethyl]ether, N,N-dimethylaminopropylamine, N,N,N',N',N'-pentamethyldiethylenetriamine, diethanolamine, 2[2-dimethylaminoethyoxyl]ethanol, N-[2-(dimethylamino)ethyl]-N-mmethylethanolamine, dimethylethanolamine, 3-dimethylamino-N,N-dimethylpropioamide, N-ethylmorpholine, and a mixture thereof.

Homogeneous catalysis with organometallic complexes is known in the art [14]. It is known that the crosslink reaction involving hydroxyl group and isocyanato group can be accelerated by variety of homogeneous and heterogeneous catalysts: metal, metal oxide, and metal complex, organometallics [14]. Nobel metals and its complex are the most active but expensive, such as platinum, rhodium and ruthenium complex. Organomercury compound, such as phenylmercuric acetate show exceptional high and selective catalyst for hydroxyl and isocyanato to form urethane group. Organolead compounds also have high catalytic activity. However, both organomercury and organolead are not preferred due to high neurotoxicology and dangerous environmental pollution.

Many metal complexes are preferred as catalyst for control crosslink reaction between isocyanato and hydroxyl or between isocyanato and secondary amine groups. Many metal complexes accelerate rate of crosslink reaction of hydroxyl and isocyanato, therefore are preferred catalyst for crosslink reaction of polyol and polyisocyanate. Metal complexes, such as dibutyltin dilaurate, maximize pot-life and minimize dry time for crosslink reaction of secondary amine and isocyanato. Therefore, metal complexes are preferred catalyst for crosslink reaction for polyaspartic ester amine resin and polyisocyanate.

Various mercaptans provide long induction time when conjunction with bismuth/zinc carboxylate. Thioglycerol is preferred mercaptans due to a long induction time and low odor.

The preferred catalyst in present invention includes tin complex which is the most popular, such as, tin carboxylate, tin octoate, tin II neodecanoate, tin II octoate, tin II oleate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate)tin, dioctyldilauryltin, and dibutyltin dilaurate combined with 1,4-diazabicyclo[2,2,2]-octane. Bismuth carboxylate, iron octoate, zinc octoate, amine-cuprous chloride complex, aluminum chelate such as aluminum dionate, zirconium chelate such as zirconium dionate, zirconium tetrakis(2,4-pentanedionate) complex, aluminum tris(2,4-pentanedionate) complex, are very effective. Crosslink is also catalyzed by titanates, such as titanium di-n-butoxide (bis-2,4-pentanedionate), titanium diisopropoxide (bis-2,4-pentanedionate), titanium diisopropoxide bis(ethylacetoacetate), titanium 2-ethylhexoxide, titanium trimethylsiloxide, frequently in combination with tin compounds and other metal oxide.

Port life extension of organometallic catalyzed reaction can be achieved with addition of diketone chelating agent, such as 2,4-pentanedione.

Organometallic catalysts are known for reactive functional siloxane application Dehydrogenative reactions and dehydrogenative crosslink reaction involving of hydride siloxane are catalyzed with variety of homogeneous and heterogeneous catalysts. It is catalyzed by titanates and tin complex, such as titanium di-n-butoxide, titanium (bis-2,4-pentanedionate), titanium diisopropoxide, titanium (bis-2,4-pentanedionate), titanium diisopropoxide, titanium bis(ethylacetoacetate), titanium 2-ethylhexoxide, titanium trimethylsiloxide, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate) tin, dioctyldilaurtltin, tin carboxylate, tin octoate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bismuth carboxylate, aluminum chelate, zirconium chelate, silver oxide, silver nitrate, silver, nitrite, tin II neodecanoate, tin II octoate, tin II oleate, zinc octoate, ion octoate, zirconium dionate, amine-cuprous chloride complex, tertiary amines, tertiary phosphines, hindered amines: 1,4-diazabicyclo(2,2,2) octane, diazabicyclo(5,4,0) undec-7-ene, tetrachlorocuprate having anilinium, p-methoxyanililinum, p-hethylanilium and pyridium cations.

Present invention utilize catalytic dehydrogenative coupling between hydride siloxane and silanol siloxane, or hydroxyl active materials and release hydrogen, and form crosslink siloxane network.

This invention discovered that hydrogen released from dehydrogenative catalytic reactions results in foaming of open cell, nano-micron cellular structure of siloxane-fluoropolyurethane network.

In other preferred embodiment of this invention hydride functional siloxane is used as reactive siloxane alone without initial addition of silanol siloxane as an ingredient for reactive siloxane composition. Since hydride functional group of siloxane reacts with atmospheric oxygen to convert to silanol siloxane or with water source such as moisture in atmospheric or in solvent results in silanol siloxane and release hydrogen. Those reactions are catalyzed by metal, metal oxide, metal salts and organometallic catalysts, such as silver oxide, silver nitrate, silver nitrite, tertiary amine and cuprous salt, organonickel, organotin, bismuth salts.

Solvent

In present invention, organic urethane grade solvent or a mixture of solvents are selected. EPA VOC-exempted solvents are preferred, such as acetone, methyl acetate, tert-butyl acetate, methylene chloride, methyl chloroform, parachlorobenzotrifluoride, cyclic, branched, or linear completely methylated siloxanes. The preferred solvents also include acetone, acetonitrile, acetophenone, amyl acetate, benzyl benzoate, bis(2-ethylhexyl) adipate, bis(2-ethylhexyl) phthalate, butanone, butyl acetate, sec-butyl acetate, tert-butyl acetate, n-butyl propionate, gama-butylolactone, chloroform, cyclohexane, cyclohexanone, cyclopentanone, dichloromethane, diethyl carbonate, diethyl ketone, diisobutyl ketone, dimethyl carbonate, N,N-dimethylacetamide, N,N-dimethylformamide, dimethyl sulfoxide dioctyl terephthalate, 1,4-dioxane, ethyl acetate, 2-ethoxyethyl ether, ethyl acetoacetate, ethyl butyrate, ethyl lactate, ethylene carbonate, cyclobutanone, cyclohexanone, cyclopentanone, ethyl isopropyl ketone, hexyl acetate, isoamyl acetate, isobutyl acetate, isobutyl isobutyrate, isopropyl acetate, isophorone, mesityl oxide, methyl acetate, methyl amyl acetate, methyl butyl ketone, methyl chloroform, methylene chloride, methyl ethyl ketone, methyl isoamyl ketone, methyl isobutyl ketone, methyl isopropyl ketone, methyl phenylacetate, methyl propyl ketone, 1-metyl-2-pyrrolidinone, octyl acetate, parachlorobenzotrifluoride, perchloroethylene, 3-pentanone, n-pentyl propionate, propyl acetate, beta-propyolactone, tetrahydrofuran, toluene, triacetin, delta-valerolactone, xylene, and cyclic, branched, or linear completely methylated siloxanes.

The anhydrous organic solvent listed above can be used as polymerization medium in the present invention. A mixture of $CO_2$ with anhydrous organic solvent or a mixture of organic solvents is preferred as polymerization medium.

Elastic Substratum

In present invention, elastic, flexible, and elastomeric have same meaning. In the present invention, substratum, basecoat, and primer have the same meaning.

In present invention anti-icing coating can be applied on any solid surface. It includes metals, alloys, ceramic, glass, thermoplastic, elastomer, closed-cell foamed elastomer, microcellular closed-cell foamed elastomer, thermoplastic elastomer, fibre-reinforced polymer composite, injection molding, casting, vacuum casting, centrifugal casting, reaction injection molding (RIM), structural reaction molding (SRIM), and reinforced reaction molding (RRIM). When anti-icing coating is applied on an elastic substratum, it provides zero ice adhesion. Therefore, elastic substratum is preferred. In present invention, anti-icing composite is novel low ice adhesion coating coated on an elastic substratum surface.

A preferred elastic substratum is an elastomer. Elastomers for spray coating, casting, molding, and reaction molding are commercially available. Preferred elastomer is a material specified by high value of elongation at break and low Glass Transition Temperature (Tg).

A special spray elastomeric polyurea has a Tg between −50° C. to −60° C., and a special spray elastomeric polyurethane has a Tg between −40° C. to −50° C. Other elastomers with a Tg lower than −40° C. are also known, such as natural rubber, fluorinated silicone rubber, styrene butadiene rubber, butadiene acrylonitrile rubber, isoprene rubber, butadiene rubber, chloroprene rubber, butyl rubber, silicone rubber, urethane rubber, thiokol rubber, fluoroelastomer, acrylate rubber, ethylene-propylene rubber, epoxide rubber, polypentenomer, and alternating rubber.

In the present invention, a preferred elastomer as substratum material is thermoset or vulcanization elastomer, thermoset or vulcanization elastomer is selected from the group consisting of polyurea elastomer, polyurethane elastomer, nature polyisoprene, cis-1,4-polyisoprene (natural rubber NR), trans-1,4-polyisoprene (gutta-percha), synthetic polyisoprene (IR), polybutadiene rubber (BR), chloroprene rubber (Neoprene, CR), poly(isobutylene-co-isoprene) (Butyl rubber, IIR), chlorobutyl rubber (CIIR), nitrile rubber (NBR), hydrogenated nitrile rubber (HNBR), ethylene propylene rubber (EPM), ethylene propylene diene rubber (EPDM), epichlorohydrin rubber (ECO), polyacrylic rubber (ACM, ABR), silicone rubber (VMQ), polyether block amide (PEBA), chlorosulfonated polyethylene (CSM), polysulfide rubber, fluorosilicone rubber (FVMQ), fluoroelastomer (FKM and FEPM), perfluoroelastomer (FFKM), polybutadiene-acrylonitrile, Tiokol, fluoroelastomer, polypentenomer, alternating rubber, polystyrene, polyether ester, polysulfide, and a mixture thereof. A preferred thermoplastic elastomer as substratum material is selected from the group consisting of polystyrenic block copolymer, polyolefin blend, elastomeric alloy (TPE-v, TPV), thermoplastic polyurethane, thermoplastic copolyester, thermoplastic polyamide, and a mixture thereof.

In the present invention, a preferred fibre-reinforced polymer composite as substrate material for elastic substratum, said fibre is selected from the group consisting of glass fibre, carbon fibre, Aramid fibre, wood fibre, and a mixture thereof, said polymer is selected from the group consisting of unsaturated polyester (UP, UPE), epoxy (EP), polyamide (PA, Nylon), vinyl ester, polyoxymethylene (POM), polypropylene (PP), polyethylene (PE), high density polyethylene (HDPE), polycarbonate (PC), acrylonitrile-butadiene-styrene (ABS), polyvinyl chloride (PVC), polyethylene terephthalate (PET), polybutylene-terephthalate (PBT), polylactic acid (PLA), vinyl ester (VE), and a mixture thereof.

In the present invention, a preferred injection molding as substratum material, the polymer used in injection molding is selected from the group consisting of thermoplastic, thermoset, elastomer, and a mixture thereof.

A wide variety of elastic surfaces may be used as a substratum according to the invention. Elastic coating, foamed, micro-foamed, sprayed, casted, molded can be used as substratum.

In this invention the most preferred elastic substratum is a closed-cell foamed elastomer or closed-cell microcellular foamed elastomer made with low Tg elastomer material by spray coating, casting, vacuum casting, centrifugal casting, molding, injection molding, reaction injection molding, and reaction injection molding processes Elastic substratum can applied on metal substrates, Properly treated metal substrates painted with solvent-borne paints, UV curable paints, spray polyurethane, spray polyurea, powder coating, plasma or thermo-sprayed thermoplastic are all suitable for elastic substratum. In the present invention, a preferred solvent-borne coating as substrate material for elastic substratum is selected from the group consisting of oxidative drying resin, amino resin, unsaturated polyester, epoxide, radiation curing, electron beam curing, vinyl polymer, alkyd resin, oligoethylene, oligopropylene, hydrocarbon resin, oligoether, oligoester, polyurethane, polyurea, epoxy, polyacrylic, polyamide, polyimide, polycarbonate, polydiene, polyester, polyether, polyfluorocarbon, polyolefin, polystyrene, polyvinyl acetal, polyvinyl chloride, polyvinylidene chloride, polyvinyl ester, polyvinyl ether, polyvinyl ketone, and a mixture thereof.

Elastic substratum can applied on thermoplastics. A preferred thermoplastic as substrate material for elastic substratum is selected from the group consisting of high density polyethylene (HDPE), low density polyethylene (LDPE), polyethylene (PE), polyvinyl chloride (PVC), polypropylene (PP), polyethylene terephthalate (PET), polymethylmethacrylate (PMMA), polycarbonate (PC), acrylonitrile-butadiene-styrene (ABS), polyamide (Nylon 6), polyimide (PI), polysulfone (PSF), polyamide-imide (PAI), polyetherimide (PEI), polyether ether ketone (PEEK), polyaryletherketone (PEAK). cyclic olefin copolymer (COC), ethylene-vinyl acetate (EVA), polyoxymethylene (POM), polyacrylate (Acrylic), polyacrylonitrile (PAN), polybutadiene (PBD), polybutylene (PB), polycaprolactone (PCL), polyester (PE), polyurethane (PU), polyurea, polyvinylidene chloride (PVDC). polyolefin, polyolefin blend, poly(ethylene-co-propylene), PP/EPDM, polystyrene (PS), polybutylene-terephthalate (PBT), polyphenylene ether (PPE), polyvinyl acetate (PVA), polyacrylethersulphone (PAES), polyphenylene sulfide, Liquid Crystal Polymer (LCP), and a mixture thereof.

Elastic substratum can applied on fibre-reinforced polymer composite. In the present invention, a preferred fibre-reinforced polymer composite as substrate for elastic substratum material, said fibre is selected from the group consisting of glass fibre, carbon fibre, Aramid fibre, wood fibre, and a mixture thereof, said polymer is selected from the group consisting of unsaturated polyester (UP, UPE), epoxy (EP), polyamide (PA, Nylon), vinyl ester, polyoxymethylene (POM), polypropylene (PP), polyethylene (PE), high density polyethylene (HDPE), polycarbonate (PC), acrylonitrile-butadiene-styrene (ABS), polyvinyl chloride (PVC), polyethylene terephthalate (PET), polybutylene-terephthalate (PBT), polylactic acid (PLA), vinyl ester (VE), and a mixture thereof.

Elastic substratum can applied on molding materials. In the present invention, preferred reaction injection molding (RIM), structural reaction molding (SRIM), and reinforced reaction molding (RRIM) is preferred as substrate material for elastic substratum. The reinforcing agent used in said RIM, SRIM, and RRIM is selected from the group consisting of glass fibre, carbon fibre, Aramid fibre, wood fibre, mica and a mixture thereof. Thermosetting polymer in said RIM, SRIM, and RRIM is selected from the group consisting of polyurethane, polyurea, polyisocyanate, unsaturated polyester, polyester, polyphenol, epoxy, polyamide, vinyl ester, and a mixture thereof.

It is known in the art that when dimension of solid substratum body reduces to micrometers, the substratum elasticity increases. When a thin anti-icing coating applied on synthetic fibers, textile, fabric, wool felt, micron fibers, or micron foam, it shows zero ice adhesion.

For strong bonding between anti-ice topcoat and substratum, a silane surface treatment is preferred. There are hundreds of silanes available. The preferred silanes for the present invention are the following: allyltrimethoxysilane, allyltriethoxysilane, 3-acryloxypropyl trimethoxysilane, 3-aminopropyl triethoxysilane, 3-aminopropyl trimethoxysilane, N-(2-aminoethyl)-3-aminopropyl trimethoxysilane, azidosulfonylhexyl triethoxysilane, 3-chloropropyl triethoxysilane, 3-chloropropyl trimethoxysilane, N-cyclohexylaminopropyl trimethoxysilane, 3-glycidopropyl trimethoxysilane, 2-(3,4-epoxycyclohexyl)ethyl trimethoxysilane, 2-(3,4-epoxycyclohexyl)ethyl trimethoxysilane, (3-glycydoxypropyl)triethoxysilane, (3-glycydoxypropyl) trimethoxysilane, 3-isocyanatopropyl triethoxysilane, 3-isocyanatopropyl trimethoxysilane, 3-methacryloxypropyl trimethoxysilane, N-methylaminopropyl trimethoxysilane, 3-mercaptopropyl trimethoxysilane, 3-thioisocyanatopropyl trimethoxysilane, bis[3-(triethoxysilyl)propyl]tetrasulfide, 3-(triethoxysilyl)propyl succinic anhydride, ureidopropyl triethoxysilane, ureidopropyl trimethoxysilane, vinyltriacetoxysilane, vinyltriethoxysilane, and vinyltrimethoxysilane.

EXAMPLE

Objects and advantages and embodiments of this invention are further illustrated by the following examples, but the particular materials and amounts thereof recited in these examples, as well as other conditions and details, should not be construed to unduly limit this invention. These examples are merely for illustrative purposes only and are not to limit the scope of the appended claims.

Example 1

Fluorinated Polyol

A 4 liter autoclave equipped with a stirrer, gas inlet port, liquid injection port, liquid sampling port, and a thermocouple, was pre-dried. 925 g of tert-butyl acetate, 552 g of Versatic 9 vinyl ester (3.0 mole, VeoVa 9), and 87 g of hydroxypropyl vinyl ether (0.75 mole) were charged in under −20° C. and slowly stirred. The autoclave was evacuated for 10 minutes and purged five times with nitrogen at 5 Bars. The autoclave was then charged with tetrafluoroethylene (TFE) under 10 Bars of pressure and heated to 95° C. Then, the autoclave was charged with tetrafluoroethylene (TFE) containing 0.01% propane under 12 Bars of pressure. 1.0 ml 0.01M of di-tert-amyl peroxide (DTAP) in t-butyl acetate solution containing 1.74 g/L of di-tert-amyl peroxide was injected to initiate polymerization. Every 10 minutes thereafter, 1.0 ml of the 0.01M di-t-amyl peroxide in t-butyl acetate solution was injected. Additionally, TFE containing 0.01% propane was continuously charged in order to maintain the pressure at 12 Bars during the polymerization and the consumption of TFE was recorded. After 5 hours, a total of 383 g (3.83 mole) of TFE was charged and both the initiator solution and TFE supply were stopped. The mixture temperature was allowed to slowly rise to 120° C. and kept there for 1 hour. Afterward, the mixture in the autoclave was lowered to room temperature and then purged with nitrogen to remove unused TFE monomers, and the system was brought to atmospheric pressure. A total of 1957 g of product was recovered. 1024 g of hydroxyl polyfunctional fluorocopolymer solved in 933 g of tert-butyl acetate was obtained.

From the results of NMR and infrared absorption spectrum analysis, the hydroxyl polyfunctional fluorocopolymer has alternating sequences of repeating units of fluorinated monomer and non-fluorinated monomer. The mole ratio of TFE: vinyl ether versatate: hydroxybutyl vinyl ether was 50/40/10 (mole %). The solids percentage was 52.3%, the hydroxyl value is 40.4 mg KOH/g, equivalent weight 1389. The VOC is 0 g/L.

Example 2

Fluorinated Polyol with High Fluorine Content

The polymerization autoclave used in Example 1 was pre-dried, and charged with 800 g of tetrahydrofuran (THF). The autoclave was cooled to −18° C., de-aerated 3 times with 4 Bars of nitrogen, and 2 times with 2 Bars of tetrafluoroethylene (TFE). Then the autoclave was charged with TFE under 10 Bars of pressure. The mixture in the autoclave was heated to 108° C. and charged with TFE to raise the pressure to 25 Bars. 1 ml 0.01M of tert-amyl peroxy-2-ethylhexanoate in THF solution containing 2.3 g/L of tert-amyl peroxy-2-ethylhexanoate was injected into the autoclave to initiate polymerization. After 45 minutes, a continuous injection of liquid reactant/initiator was started with a flow rate of 1.0 ml/minute of solution containing 200 g of vinyl isobutyl ether (2.0 mol), 51 g of hydroxypropyl vinyl ether (0.50 mol), and 0.023 g of tert-amyl peroxy-2-ethylhexanoate (1.0E-4 mol) in 40 g of THF. Additionally, TFE was continuously charged in order to maintain the pressure at 25 Bars during the polymerization and the consumption of TFE was recorded. After 6 hours from the initiation of the polymerization, a total of 508 g of TFE (5.08 mol) was charged, and both the monomer/initiator solution and the TFE supply were stopped.

The mixture temperature was allowed to rise to 125° C. and kept there for 1 hr. The mixture in the autoclave was lowered to room temperature and then purged with nitrogen to remove unused monomers, and the system was brought to atmospheric pressure.

The obtained hydroxyl polyfunctional fluorocopolymer in THF solution was transparent when it was removed from the autoclave. 750 g of hydroxyl polyfunctional fluorocopolymer with high fluorine content dispersed in 830 g of THF was recovered as transparent solution. The transparent solution gradually separated to two layers: a transparent upper layer and a translucent under layer after a week.

From the results of NMR and infrared absorption spectrum analysis, the hydroxyl polyfunctional fluorocopolymer had random block sequences of repeating units of TFE, repeating units of vinyl isobutyl ether, and repeating units of hydroxypropyl vinyl ether with a ratio of: 10/4/1 (mol %). The hydroxyl value is 32.2 mg KOH/g. The solid is 47.5%, equivalent weight 1742

Example 3

Isocyanato Fluorinated Polymer

A 2,500 ml five-neck round-bottom glass flask having a heating/cooling jacket and equipped with turbine stirrer, thermocouple, nitrogen inlet, liquid dripping funnel, and condenser connected with a nitrogen bubbler was pre-dried. 500 g of hydroxyl polyfunctional fluorinated copolymer in tert-butyl acetate solvent obtained by Example 1 (52.3% solid, hydroxyl value 40.4 mg KOH/g, equivalent weight 1389), and 150 ml toluene was added. Nitrogen was bubbled into the solution under slow stirring. The flask was heated to a boiling temperature. The refluxing solvent past through 40 cm high, 18 mm O.D. column filled with dried 5A molecular sieve, and returned to the flask. The refluxing was held for 1 hour. Then, the toluene was distilled out. The system was cooled to 25° C. 44 g of isophorone diisocyanate (1-isocyanatomethyl-1,3,3-trimethyl-5-isocyanato-cyclohexane, Bayer, Desmodur® I, Assay≥99.5%, NCO≥37.7%, equivalent weight 111) was admitted to the stirred mixture drop-wise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 80° C. for an additional hour. The free isocyanate content was measured. The system was reduced to room temperature, and 2 ml of hydroquinone 10% solution in butyl acetate was added. A total of 510 g of polyfunctional isocyanato fluorinated prepolymer in tert-butyl acetate solution was obtained. The isocyanato functional fluorinated polymer had a solid content of 59.6% and NCO content of 2.62%, equivalent weight 1612.

Example 4

Perfluoropolymer PTFE (Particles-Partially De-Agglomerate Micron Particles Agglomerated by Nano PTFE Particles)/Fluorinated Polyol Blend A 4-neck 500 ml borosilicate sonochemical reaction vessel equipped with mechanical stirring in the center neck, thermocouple in a side neck, pressure balance in a side neck, a 5 inch long and ¾ inch diameter ultrasonic horn (probe) in a side neck with bushing and an O-ring seal. A 600 Watt high intensity ultrasonic processor power supplier supplied the 20 kHz electricity into the horn. 106 g of fluorinated polyol obtained by Example 1 (52.3% solid, hydroxyl value 40.4 mg KOH/g, equivalent weight 1390), 28.0 g PTFE powder (DuPont, Zonyl® MP 1000, average agglomerate size of 8-15 micron, ultimate reduction to 200 nanometer), and 150 ml of methyl ethyl ketone were mixed in said reaction vessel which was placed in an ice-salt (1:3 ratio) bath (−20° C.). The contents were cooled by stirring until the temperature reached 0° C. The mixture was illuminated with an ultrasound (50% pulse mode) for 15 minutes. The temperature of the mixture rose to 17° C. After stopping ultrasonic illumination the mixture was kept under room temperature. Partial de-agglomerate micron particles of PTFE nano agglomerate had been obtained by ultrasonic probe. A total of 234 g of a translucent blend of PTFE powders in fluorinated polyol was obtained (33.7% solid, PTFE concentration 33.6%, hydroxyl value 26.1 mg KOH/g, equivalent weight 2153).

Example 5

Perfluoropolymer PTFE Particles Dispersion (Partial De-Agglomerate Micron Particles Agglomerated by Nano PTFE Particles)

In a 2 liter net volume high speed closed vertical bead mill with external water cooling 1,125 g (300 ml) of zirconia beads (Yttia stabilized, 0.4-0.6 mm), 320 g of TPFE micron powder (DuPont, Zonyl® MP 1600, average agglomerate size of 4-12 micron, ultimate reduction to 200 nanometer), and 500 ml of tert-butyl acetate were charged. Milling continues for 1 hr at 2900 RPM speed. The beads were filtered out and washed with total 80 ml of tert-butyl acetate three times. The recovered finely dispersed PTFE in tert-butyl acetate was collected in a 2,000 ml glass beaker. The total recovered dispersion was 673 g. Partial de-agglomerate micron particles of PTFE nano agglomerate had been obtained by media mills. The total recovered PTFE was 281 g at a yield of 88%. The dispersion of PTFE particles in tert-butyl acetate has solid content of 41.5%.

Example 6

Aliphatic Isocyanate Prepolymer

A 1,000 ml five-neck round-bottom glass flask having a heating/cooling jacket and equipped with stirrer, thermocouple, nitrogen inlet, liquid dripping funnel, and condenser connected with a vacuum pump system was pre-dried. 159.3 g of hydroxyl polyfunctional fluorinated copolymer in tert-butyl acetate solvent obtained by Example 1 (52.3% solid, hydroxyl value 40.4 mg KOH/g, equivalent weight 1389), 200.0 g of polycaprolactone polyol (Bayer, Baycol® AD5055, diol, hydroxyl value 56.0 mg KOH/g, equivalent weight 1,000), 80.0 g of polycarbonate polyol (Bayer, Desmophen® C2200, diol, hydroxyl value 56.0 mg KOH/g, equivalent weight 1,000), 40.0 g of polyether polyol (Bayer, Desmophen® 2060 BD, diol, hydroxyl value 28.5 mg KOH/g, equivalent weight 1,000), 60.0 g of polyether polyol (Bayer, Desmophen® 3061 BD, triol, hydroxyl value 56.0 mg KOH/g, equivalent weight 1,000), and 4.51 g of trimethylolpropane (hydroxyl value 1247 mg KOH/g, molecular weight 135.1, purity 99.8%), and 40.0 g of tert-butyl acetate were added. Glass flask was heated with nitrogen gas bubbled under slow stirring. The flask was heated to keep at boiling temperature. The refluxing solvent passed through 40 cm high, 18 mm O.D. column filled with dried 5A molecular sieve, and returned to the flask. The refluxing was held for 1 hour. Then the system was cooled to 30° C. 123.5 g of isophorone diisocyanate (1-isocyanatomethyl-1,3,3-trimethyl-5-isocyanato-cyclohexane, (Bayer, Desmodur® I, Assay≥99.5%, NCO≥37.7%, equivalent weight 111) was admitted to the stirred mixture drop-wise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 80° C. for an additional 2 hours. The free isocyanate content was measured. The system was reduced to room temperature. 1 ml of 10% hydroquinone in butyl acetate was added. A total of 672 g of polyfunctional isocyanato fluorinated/aliphatic prepolymer was obtained. The isocyanato functional fluorinated/aliphatic prepolymer had solid content of 75%, NCO content of 3.93%, and equivalent weight 1067.

Example 7

Aliphatic Polyol Prepolymer

A 1,000 ml five-neck round-bottom glass flask having a heating/cooling jacket and equipped with stirrer, thermocouple, nitrogen inlet, liquid dripping funnel, and condenser connected with a vacuum pump system was pre-dried. 100.0 g of polycaprolactone polyol (Bayer, Baycol® AD5055, diol, hydroxyl value 56.0 mg KOH/g, equivalent weight 1,000), 80.0 g of polycarbonate polyol (Bayer, Desmophen® C2200, diol, hydroxyl value 56.0 mg KOH/g, equivalent weight 1,000), 20.0 g of polyether polyol (Bayer, Desmophen® 2060 BD, diol, hydroxyl value 28.5 mg KOH/g, equivalent weight 1,000), 120.0 g of polyether polyol (Bayer, Desmophen® 3061 BD, triol, hydroxyl value 56.0 mg KOH/g, equivalent weight 1,000), and 16.1 g of trimethylolpropane (hydroxyl value 1247 mg KOH/g, molecular weight 135.1, purity 99.8%), and 80.0 g of tert-butyl acetate were added. Glass flask was slowly heated with nitrogen gas bubbled under slow stirring. The flask was heated to keep at boiling temperature. The refluxing solvent was past through 40 cm high, 18 mm O.D. column filled with dried 5A molecular sieve, and returned to the flask. The refluxing was held for 1 hour. Then the system was cooled to 35° C. 60.0 g of isophorone diisocyanate (1-isocyanatomethyl-1,3,3-trimethyl-5-isocyanato-cyclohexane, (Bayer, Desmodur® I, Assay≥99.5%, NCO≥37.7%, equivalent weight 111) was admitted to the stirred mixture drop-wise slowly over a one hour under a nitrogen blanket. The temperature of the reaction mixture was kept below 40° C. to 50° C. by adjusting the drip rate and the medium temperature in the cooling jacket. To avoid a gelatin, the addition of isocyanate should be processed without interruption. The stirred reaction mixture was kept under 70° C. to 75° C. for an additional 2 hours. Add 2.0 g of tin complex catalyst (Air Products, Dabco 112) and the stirred reaction mixture was kept under 70° C. to 75° C. for an additional 2 hours. The free isocyanato group was measured. The system was reduced to room temperature. 1 ml of 10% hydroquinone in butyl acetate was added. Product solid percentage was adjusted to 75% by addition of tert-butyl acetate. A total of 396 g of polyfunctional isocyanato fluorinated/aliphatic prepolymer was obtained. The hydroxyl functional prepolymer had solid 75%, hydroxyl value of 19.28 mg KOH/g, and equivalent weight 2911.

Example 8

Polyaspartic Ester Amine-Functional Siloxane

The 2500 ml five-neck, jacketed round-bottom glass flask used in Example 3 was pre-dried. 1000 g (0.5 mol) of alpha, omega-bis(3-aminopropyl)polydimethylsiloxane (Gelest®, DMS-A13, $NH_2$ 1.5%, molecular weight 2000) was charged in. Nitrogen was bobbled in the solution under slow stirring for 15 minutes. The system temperature has been kept at 15° C. 180 ml of xylene and 192 g of diethyl maleate (1.08 mol, Assay 97%, and molecular weight 172) was dripped in slowly to the stirred solution via the dripping funnel over 2 hours under nitrogen bubbling. The system temperature was kept between 40° C. After finish dripping the temperature of reaction mixture in the flask was risen to 80° C. for 8 hours and 90° C. for 12 hour. The reaction mixture was kept under ambient temperature for 24 hrs. The total solid is adjusted to 85% by addition of xylene. The resulting content was removed from the flask. The solid content was adjusted to 85% by addition of xylene. A total 1175 g of polyaspartic ester siloxane amine based on bis(3-aminopropyl)polydimethylsiloxane in 207 g of xylene was obtained. The polyaspartic ester amine functional polydimethylsiloxane had solids content 85%, NH content 1.1%, and equivalent weight 1170.

Example 9

Isocyanato Urea-Siloxane Polymer

The 2,500 ml five-neck, round-bottom jacketed glass flask used in Example 3 was pre-dried. 150 ml of N,N-dimethylformamide (DMF, Alpha Aesar, water≤20 ppm), 150 ml of xylene, 275 g of methylene bis(4-cyclohexyl isocyanate) (Bayer, Desmodur® W, Assay≥99.5%, NCO≥31.8%, equivalent weight 131) were added. Nitrogen was bubbled into the solution under slow stirring for 30 minutes. The system temperature was kept at 4° C. 1375 g of alpha, omega-bis (N-ethyl aminoisobutyl)polydimethylsiloxane (Gelest®, DMS-A214, NH 1.0-1.4%, and molecular weight of 2500-3000) was slowly dripped into the stirred solution via the dripping funnel over the course of 2 hours under nitrogen bubbling. The system temperature was kept between 0-10° C. After the dripping finished, the temperature of the reaction mixture in the flask was allowed to rise to 25° C. for 2 hours. 2 ml of hydroquinone 10% solution in butyl acetate was added. The mixture was then kept under room temperature for an additional 24 hrs. The resulting content was removed from the flask. The total solids were adjusted to 50% by the addition of xylene. A total of 1640 g of polyfunctional isocyanato siloxane prepolymer in 1640 g of N,N-dimethylformamide/xylene solution was obtained. The isocyanato functional urea-siloxane prepolymer had a solids content of 50%, and NCO content of 2.56%, equivalent weight 1640.

Example 10

Ice Adhesion Test—Ice on Plate Test

Ultra Low freezer (LFZ-60 L, −60° C., upright) was modified to set temperature at −40 to −50° C., All shelves on a freezer rack were adjusted on horizontal position. Each shelve had a plastic skid plate for holding sample plates. Samples of composite plates were placed on plastic plate with face up. 20 separated distilled water drops with each 1.00 ml volume were delivered with lab pipette on each composite plate. Each plastic skid plate with samples was carefully slid in, and door of freezer was closed. After freezer reaching −40 to −50° C. and keeping for 1 hour, composite plate with frozen ice drops was removed from freezer for test ice adhesion. The separated ice drops were picked up by a nozzle of a potable vacuum cleaner, if adhesion force is low. The separated ice drops also can be swept-off from composite surface by air pulse from an air gun connected with low pressure compressed air (15 psig). Remained ice drops on composite surfaces will be counted if any. The procedure was repeated 20 times for each composite plate. If a composite shown that 80% of ice drops were separated and easily picked up by vacuum or swept-off by air pulse during 20 times of repeat icing/ice removal cycles, it define that the composite is ice phobic.

Example 11

Anti-Icing Composite

Typical catalytic reaction composition of fluorinated polyurethane containing PTFE particles was prepared as following: 3.253 g of blend of PTFE particles in fluorinated polyol obtained in Example 4 (33.7% solid, PTFE 33.6%, hydroxyl value 26.1 mg KOH/g, equivalent weight 2153), 0.106 g of aliphatic polyisocyanate (Bayer, Desmodur®

N3600, and equivalent weight 183), and 0.014 g of bismuth carboxylate catalyst (King Industries, K KAT® 348, 75% solid) were weighted into a test tube. The mixture was stirred vigorously. This formulation was repeated for each single sample of anti-icing composite.

Elastic substratum was microcellular closed-cell foamed polyurethane blocks by reaction injection molding (RIM) with dimensions about 100 mm×160 mm×12 mm. Elastic substratum samples were machine sanded to flatten and remove surface scales with sequential #110, #180, and #220 sandpapers. Each labeled sample was coated with fresh prepared PTFE/fluorinated polyurethane sample with Double Blade Micrometer Film Applicator. The applicator was set to coat wet film thickness of 127 micron (5 mils). Preparation of PTFE/fluorinated polyurethane was repeated for supply coating for each substrate sample.

The samples were cured and dried under ambient temperature for 3 days.

The samples of anti-icing composite were tested for ice adhesion tests according to the Ice on Plate Tests of Example 10. The composites for preventing ice adhesion were passed the ice phobic standard.

Example 12

Anti-Icing Composite 2.195 g of fluorinated polyol with high fluorine content obtained in Example 2 (47.5% solid, hydroxyl value 32.2 mg KOH/g, equivalent weight 1742), 2.632 g of perfluoropolymer PTFE particles dispersion in tert-butyl acetate obtained in Example 5 (PTFE content 41.5%), 1.701 g of isocyanato functional fluorinated polymer (59.6% solid, NCO contents 2.62%, and equivalent weight of 1612) obtained in Example 3, and 0.031 g (2 drops) of tin catalyst (Air Products, Dabco® T-12) were weighted in a test tube. The content was stirred vigorously. The PTFE particles/fluorinated polyurethane was prepared. This formulation was repeated for each single sample of anti-icing composite.

Eight pieces of ethanol pre-cleaned glass fiber-reinforced unsaturated polyester (polyester, Corvex®) composite of size about 100 mm×160 mm×20 mm were coated with sprayed microcellular closed-cell foamed aliphatic polyurethane. The surfaces were machine flattened with 220 grit sandpaper (Norton, Wet/Dry) as elastic substratum. Each sprayed polyurethane foam samples was coated with PTFE particles/fluorinated polyurethane by Wire Wound Rod having wire size #50. The coats had wet film thickness of 127 micron (5 mils).

The preparation of composite of PTFE particles/fluorinated polyurethane on elastic substratum was repeated for each substrate. The samples of composite for preventing ice adhesion were tested by Ice on Plate Tests according Example 10. All samples were ice-phobic defined by the tests.

Example 13

Anti-Icing Composite

Selected elastic substratum sheets were cut to dimensions of 100 mm×150 mm with following materials: microcellular closed cell foamed polyurethane bt RIM, microcellular closed-cell foamed ethylene-propylene copolymer, EPDM rubber sheets, natural rubber sheets, and neoprene rubber sheets. 5 sheets for each material were prepared.

A 200 ml of reactive silane mixture for treating elastic substratum was prepared with ingredient concentrations as following: 3-mercaptopropyl trimethoxysilane (0.25%), bis-[3-(triethoxysilyl)propyl]tetrasulfide (0.30%) in methanol (98%) and water (2%) solution with pH 8 (0.01 M succinic acid and 0.01 M lithium hydrogen succinate).

All samples were wetted with reactive silane solution by siphon spray. All samples were air dried in ambient temperature for 8 hours.

9.122 g of aliphatic polyol prepolymer by Example 7 (solid content 75%, hydroxyl value of 19.28 mg KOH/g, and equivalent weight 2911), 8.020 g of PTFE particle dispersion in tert-butyl acetate obtained in Example 5 (PTFE content 41.5%), and 3.513 g of aliphatic isocyanate prepolymer obtained by Example 6 (solid content of 75%, NCO content of 3.93%, and equivalent weight 1067) were mixed in a 100 ml beaker. 0.039 g of tin catalyst (Air Products, Dabco® T-12) were added. 50 ml of methyl ethyl ketone and 5 ml of acetone were added into the beaker. The mixture was stirred for 5 minutes by glass rod as PTFE particle/fluorinated polyurethane catalytically reactive composition.

Dried, filtrated air was supplied to a gravity feed sprayer. The air pressure was set to 35 psig. PTFE/fluorinated polyurethane composition was added into the cup of gravity feed sprayer gun. 5 thin sprayed coating layers were applied to each elastic substratum. The coated substratum samples were kept in ambient temperature on a shelf for 3 days. Prepared anti-icing composite samples were tested following Example 4 (Ice on Plate Tests). All samples were ice-phobic defined by the tests.

Example 14

Anti-Icing Composite

Elastic substratum was microcellular closed cell foamed polyurethane elastomer blocks by RIM with dimensions about 100 mm×160 mm×12 mm. Elastic substratum samples were machine sanded to flatten and remove surface scales with sequential #110, #180, and #220 sandpapers.

In a 250 ml glass beaker 50.3 g of PTFE particles/fluorinated polyol blend obtained in Example 4 (33.7% solid, PTFE 33.6%, hydroxyl value 26.1 mg KOH/g, equivalent weight 2153), 1.405 g of polyaspartic ester amine functional polydimethylsiloxane obtained in Example 8 (solids 85%, NH content 1.1%, and equivalent weight 1170), 24.6 g of polyfunctional isocyanato fluorinated polymer obtained in Example 3 (59.6% solid, NCO 2.6%, equivalent weight 1612), and 60 ml of xylene were added. After thoroughly mixing, 0.756 g of dibutyltin dineodecanoate (tin 18%) was mixed in. It formed PTFE particle/fluorinated polyurethane-polyurea-siloxane INP catalytic reaction composition for anti-icing coating.

Each elastic RIM polyurethane microcellular closed cell foam sample was coated with fresh prepared PTFE/fluorinated polyurethane-polyurea-siloxane composite by Wire Wound Rod having wire size #50. The coats had wet film thickness of 127 micron (5 mils). Prepared anti-icing composite with elastic substratum samples were cured and dried under ambient temperature for 3 days.

The samples of anti-icing composite were tested for ice adhesion tests according to the Ice on Plate Tests of Example 10. The composites for preventing ice adhesion were passed the ice phobic standard.

The invention claimed is:

1. An anti-icing composite comprising an interpenetrating crosslinked network coating composition applied onto an elastic substratum, wherein said coating composition comprises: (1a) at least a plurality of fluorinated polymer particles; (1b) at least a fluorinated reactant having a plurality of reactive groups, wherein said reactive group(s) is selected from hydroxyl, hindered amino, aspartic ester amino, and a mixture thereof; (1c) at least a polyisocyanate; (1d) at least a siloxane reactant having a plurality of reactive groups, wherein said reactive group(s) is selected from amino, carbinol, hydride, silanol, and a mixture thereof; (1e) at least a catalyst; and (1f) at least a solvent.

2. The anti-icing composite of claim 1, wherein said plurality of fluorinated polymer particles is a plurality of fluoroolefin polymer powders, said fluoroolefin polymer is selected from the group consisting of polytetrafluoroethylene, polyhexafluoropropylene, tetrafluoroethylene-hexafluoropropylene copolymer, poly(vinylidene difluoride), polydifluoroethylene, polytrifluoroethylene, and a mixture thereof.

3. The anti-icing composite of claim 1, wherein said fluorinated reactant is selected from the group consisting of telechelic difunctional fluorinated polyol, pendant fluorinated polyol, and a mixture thereof; said pendant fluorinated polyol is synthesized by copolymerization of monomers comprising: (3a) a plurality of fluorinated units being fluoroolefins, (3b) a plurality of oleophilic units being unsaturated oxygen-containing aliphatic or cycloaliphatic monomers, and (3c) a plurality of hydroxyl functional units being hydroxyl functional unsaturated monomers.

4. The anti-icing composite of claim 1, wherein said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, polyisocyanates based on isophorone diisocyanate, polyisocyanates based on 4,4'-diisocyanato dicyclohexylmethane, isocyanato terminated polyether prepolymer, isocyanato terminated polyester prepolymer, isocyanato terminated polycarbonate prepolymer, isocyanato terminated polycaprolactone prepolymer, isocyanato terminated fluorinated telechelic prepolymer, isocyanato terminated fluorinated pendant prepolymer, and a mixture thereof.

5. The anti-icing composite of claim 1, wherein said catalyst is selected from the group consisting of tertiary amine, organometallic complex, and a mixture thereof; said tertiary amine is selected from the group consisting of triethylenediamine, 1,4-diazabicyclo[2,2,2]octane, N,N-dimethylcyclohexylamine, dimethylethanolamine, bis[2-dimethylaminoethyl]ether, N,N-dimethylaminopropylamine, N,N,N',N',N'-pentamethyldiethylenetriamine, diethanolamine, 2[2-dimethylaminoethyoxyl]ethanol, N-[2-(dimethylamino)ethyl]-N-mmethylethanolamine, dimethylethanolamine, 3-dimethylamino-N,N-dimethylpropioamide, N-ethylmorpholine, and a mixture thereof; said organometallic complex is selected from the group consisting of tin carboxylate, tin octoate, tin neodecanoate, tin octoate, tin oleate, dibutyltin diacetate, dibutyltin dilaurate, dibutyltin diisooctylmaleate, dimethyltin dineodecanoate, dioctyltin dilaurate, bis(2-ethylhexanoate)tin, stannous octoate, bis(2-ethylhexanoate)tin, bis(neodecanoate)tin, di-n-butyl bis(2-ethylhexylmaleate)tin, di-n-butyl bis(2,4-petanedionate)tin, di-n-butylbutoxychlorotin, di-n-butyldiacetoxytin, di-n-butyldilauryltin, di-n-butyldilauryltin, dimethyldineodecanoatetin, dimethylhydroxy(oleate)tin, dioctyldilauryltin, bismuth carboxylate, iron octoate, zinc octoate, amine-cuprous chloride complex, zirconium dionate, zirconium tetrakis(2,4-pentanedionate) complex, aluminum dionate, aluminum tris(2,4-pentanedionate) complex, titanium di-n-butoxide (bis-2,4-pentanedionate), titanium diisopropoxide (bis-2,4-pentanedionate), titanium diisopropoxide bis(ethylacetoacetate), titanium 2-ethylhexoxide, titanium trimethylsiloxide, and a mixture thereof.

6. The anti-icing composite of claim 1, wherein said solvent is selected from the group consisting of acetone, methyl acetate, tert-butyl acetate, methylene chloride, methyl chloroform, parachlorobenzotrifluoride, acetonitrile, acetophenone, amyl acetate, benzyl benzoate, bis(2-ethylhexyl) adipate, butanone, butyl acetate, sec-butyl acetate, tert-butyl acetate, n-butyl propionate, gama-butylolactone, chloroform, cyclohexanone, cyclopentanone, dichloromethane, diethyl carbonate, diethyl ketone, diisobutyl ketone, dimethyl carbonate, N,N-dimethylacetamide, N,N-dimethylformamide, dimethyl sulfoxide dioctyl terephthalate, 1,4-dioxane, 2-ethoxyethyl ether, ethyl acetoacetate, ethyl butyrate, ethyl lactate, ethylene carbonate, cyclobutanone, cyclohexanone, cyclopentanone, ethyl isopropyl ketone, hexyl acetate, isoamyl acetate, isobutyl acetate, isobutyl isobutyrate, isopropyl acetate, isophorone, methyl acetate, methyl amyl acetate, methyl butyl ketone, methyl chloroform, methyl isoamyl ketone, methyl isobutyl ketone, methyl isopropyl ketone, methyl propyl ketone, 1-methyl-2-pyrrolidinone, octyl acetate, parachlorobenzotrifluoride, perchloroethylene, 3-pentanone, n-pentyl propionate, beta-propyolactone, tetrahydrofuran, toluene, delta-valerolactone, xylene, cyclic methylated siloxanes, branched methylated siloxanes, linear methylated siloxanes and a mixture thereof.

7. The anti-icing composite of claim 1, wherein said coating composition contains a siloxane reactant having a plurality of reactive groups, said reactive group is selected from the group consisting of aminoalkyl, carbinol, silanol, hydride, polyaspartic ester amine, and a mixture thereof.

8. The anti-icing composite of claim 1, wherein said coating composition contains a polyfunctional aliphatic reactant selected from the group consisting of aliphatic polyol, aliphatic polyalkylamine, and a mixture thereof; said aliphatic polyol is selected from the group consisting of polyether polyol, polyester polyol, polyacrylic polyol, polycaprolactone polyol, polycarbonate polyol, polybutadiene polyol, polysulfide polyol, polyethylene glycol, polypropylene glycol, poly(tetramethylene ether) glycol, castor polyol, vegetable polyol, and a mixture thereof; said aliphatic polyalkylamine is selected from the group consisting of polyaspartic ester amine, aldimine, polycaprolactone polyalkylamine, polycarbonate polyalkylamine, polyether polyalkylamine, polyester polyalkylamine, polyacrylic polyalkylamine, and a mixture thereof.

9. The anti-icing composite of claim 1, wherein said coating composition contains a chain extender selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, glycerol, trimethylolpropane, 1,2,6-hexanetriol, triethanolamine, N,N,N',N'-tetrakis (2-hydroxypropyl) ethylenediamine, and a mixture thereof.

10. The anti-icing composite of claim 1, wherein said coating composition contains a surface fluorine enrichment additive selected from the group consisting of perfluoroalkylethyl alcohol, fluorotelomer alcohol, PFPO fluorotelechelic diol, PFPE fluorotelechelic diol, fluorine-rich polyol oligomer containing at least a fluorine-rich monomer unit, and a mixture thereof; said fluorine-rich monomer is selected from the group consisting of perfluoroalkyl acrylate, perfluoroalkyl vinyl ether, and a mixture thereof.

11. The anti-icing composite of claim 1, wherein said elastomer is selected from the group consisting of polyurea elastomer, polyurethane elastomer, natural polyisoprene, cis-1,4-polyisoprene, trans-1,4-polyisoprene, synthetic polyisoprene, polybutadiene rubber, chloroprene rubber, Neoprene, poly(isobutylene-co-isoprene), chlorobutyl rubber, nitrile rubber, hydrogenated nitrile rubber, ethylene propylene rubber, ethylene propylene diene rubber, epichlorohydrin rubber, polyacrylic rubber, silicone rubber, polyether block amide, chlorosulfonated polyethylene, polysulfide rubber, fluorosilicone rubber, fluorocarbon elastomer, perfluoroelastomer, polybutadiene-acrylonitrile, fluoroelastomer, polypentenomer, alternating rubber, polystyrene, polyether ester, polysulfide, polystyrenic block copolymer, polyolefin blend, elastomeric alloy, thermoplastic polyurethane, thermoplastic polyester, thermoplastic polyamide, thermoplastic polyamide, carboxylated nitrile rubber, hydrogenated nitrile rubber, ethylene propylene rubber, and a mixture thereof.

12. An anti-icing composite comprising a coating composition applied onto an elastic substratum, wherein said elastic substratum is selected from the group consisting of elastomer, closed-cell foamed elastomer, microcellular closed-cell foamed elastomer, and a mixture thereof; and, wherein said coating composition comprises: (14a) at least a plurality of fluorinated polymer particles; (14b) at least a polyol prepolymer; wherein said polyol prepolymer is created by the reaction of polyisocyanate with excess aliphatic polyol having a plurality of hydroxyl groups, said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, and a mixture thereof (14c) at least a polyisocyanate having a plurality of isocyanato terminated reactive groups; (14d) at least a siloxane reactant having a plurality of reactive groups, said reactive group is selected from the group consisting of aminoalkyl, carbinol, hydride, silanol, polyaspartic ester amine, and a mixture thereof; (14e) at least a catalyst; said catalyst is selected from the group consisting of tertiary amine, organometallic complex, and a mixture thereof; and (14f) at least a solvent.

13. An anti-icing composite comprising a coating composition applied onto an elastic substratum, wherein said elastic substratum is selected from the group consisting of elastomer, closed-cell foamed elastomer, microcellular closed-cell foamed elastomer, and a mixture thereof; and, wherein said coating composition comprises: (15a) at least a plurality of fluorinated polymer particles; (15b) at least a polyisocyanate prepolymer wherein said polyisocyanate prepolymer is created by reacting excess polyisocyanate with aliphatic polyol having a plurality of hydroxyl groups; said polyisocyanate is selected from the group consisting of hexamethylene diisocyanate, isophorone diisocyanate, 4,4'-diisocyanato dicyclohexylmethane, polyisocyanates based on hexamethylene diisocyanate, hexamethylene diisocyanate biuret, hexamethylene diisocyanate trimer, and a mixture thereof; (15c) at least a chain extender having a plurality of reactive groups, said reactive group is selected from the group consisting of hydroxyl, amino, polyaspartic ester amine, and a mixture thereof; (15d) at least a siloxane reactant having a plurality of reactive groups, said reactive group is selected from the group consisting of aminoalkyl, carbinol, hydride, silanol, polyaspartic ester amine, and a mixture thereof; (15e) at least a catalyst, said catalyst is selected from the group consisting of tertiary amine, organometallic complex, and a mixture thereof; and (15f) at least a solvent.

* * * * *